United States Patent
Loehr et al.

(10) Patent No.: US 12,137,456 B2
(45) Date of Patent: *Nov. 5, 2024

(54) MULTIPLE SIDELINK CONTROL TRANSMISSIONS DURING A SIDELINK CONTROL PERIOD

(71) Applicant: Sun Patent Trust, New York, NY (US)

(72) Inventors: Joachim Loehr, Hessen (DE); Prateek Basu Mallick, Hessen (DE); Lilei Wang, Beijing (CN)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,690

(22) Filed: Sep. 12, 2023

(65) Prior Publication Data

US 2023/0422249 A1    Dec. 28, 2023

Related U.S. Application Data

(63) Continuation of application No. 17/382,115, filed on Jul. 21, 2021, now Pat. No. 11,792,800, which is a
(Continued)

(51) Int. Cl.
*H04W 72/20*    (2023.01)
*H04W 72/02*    (2009.01)
(Continued)

(52) U.S. Cl.
CPC ........... *H04W 72/20* (2023.01); *H04W 72/02* (2013.01); *H04W 72/0446* (2013.01); *H04W 72/56* (2023.01)

(58) Field of Classification Search
CPC . H04W 72/20; H04W 72/02; H04W 72/0446; H04W 72/56; H04W 72/23; H04W 72/04
See application file for complete search history.

(56) References Cited

U.S. PATENT DOCUMENTS

2013/0163543 A1*   6/2013   Freda .................... H04W 16/14
                                                                370/329
2013/0225184 A1    8/2013   Liu et al.
(Continued)

FOREIGN PATENT DOCUMENTS

EP            3284299 A1    2/2018
WO      WO 2015139862 A1    9/2015
(Continued)

OTHER PUBLICATIONS

Panasonic, "Multiple SA transmissions during one SC period," R2-153259, 3GPP TSG RAN WG2 Meeting #91, Beijing, China, Aug. 24-28, 2015, 3 pages. (Year: 2015).*
(Continued)

*Primary Examiner* — Thinh D Tran
(74) *Attorney, Agent, or Firm* — Seed IP Law Group LLP

(57) ABSTRACT

The invention relates to the allocation of radio resources by a transmitting user equipment to perform a plurality of direct SL transmissions to one or more receiving user equipments. The allocation of radio resources within a SC period is restricted, for the SC period, by a maximum number of SL processes with which a transmitting user equipment is configured. A plurality of SL grants is acquired. Among the acquired SL grants a number of those SL grants is selected that have most recently been acquired before the start of the subsequent SC period. A plurality of SL processes is associated such that each of the plurality of SL process is associated with a different one of the selected number of SL grants. For each of the plurality of the SL processes, the radio resources are allocated. Each of the plurality of SL transmissions comprises at least one SCI transmission and at least one data transmission over the SL interface.

12 Claims, 9 Drawing Sheets

Related U.S. Application Data continuation of application No. 16/940,779, filed on Jul. 28, 2020, now Pat. No. 11,109,362, which is a continuation of application No. 15/769,329, filed as application No. PCT/CN2015/093960 on Nov. 6, 2015, now Pat. No. 10,764,866.

(51) Int. Cl.
  *H04W 72/0446* (2023.01)
  *H04W 72/56* (2023.01)

(56) References Cited

U.S. PATENT DOCUMENTS

| | | | |
|---|---|---|---|
| 2013/0322413 A1 | 12/2013 | Pelletier et al. | |
| 2016/0128082 A1 | 5/2016 | Chen et al. | |
| 2016/0183276 A1* | 6/2016 | Marinier | H04W 72/04 370/329 |
| 2017/0094656 A1 | 3/2017 | Chen et al. | |
| 2017/0127405 A1 | 5/2017 | Agiwal et al. | |
| 2018/0013521 A1 | 1/2018 | Lee et al. | |
| 2018/0077746 A1 | 3/2018 | Lee et al. | |
| 2018/0317248 A1 | 11/2018 | Yi et al. | |

FOREIGN PATENT DOCUMENTS

| | | |
|---|---|---|
| WO | WO 2015142895 A1 | 9/2015 |
| WO | WO 2015142898 A1 | 9/2015 |
| WO | WO 2015142900 A1 | 9/2015 |

OTHER PUBLICATIONS

3GPP TR 36.843 V12.0.1, "3rd Generation Partnership Project; Technical Specification Group Radio Access Network; Study on LTE Device to Device Proximity Services; Radio aspects (Release 12)," Mar. 2014, 50 pages.
3GPP TS 23.303 V12.4.0, "3rd Generation Partnership Project, Technical Specification Group Services and System Aspects; Proximity-based services (ProSe); Stage 2 (Release 12)," Mar. 2015, 63 pages.
3GPP TS 36.211 V8.9.0, "3rd Generation Partnership Project; Technical Specification Group Radio Access Network; Evolved Universal Terrestrial Radio Access (E-UTRA); Physical channels and modulation (Release 8)," Dec. 2009, 83 pages.
3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)," Mar. 2015, 94 pages.
3GPP TS 36.213 V15.1.0, "3rd Generation Partnership Project; Technical Specification Group Radio Access Network; Evolved Universal Terrestrial Radio Access (E-UTRA); Physical layer procedures (Release 15)," Mar. 2018, 495 pages.
3GPP TS 36.300 V12.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Mar. 2015, 251 pages.
3GPP TS 36.321 V12.5.0, "3rd Generation Partnership Project; Technical Specification Group Radio Access Network; Evolved Universal Terrestrial Radio Access (E-UTRA), Medium Access Control (MAC) protocol specification (Release 12)," Mar. 2015, 77 pages.
3GPP TS 36.321 V12.7.0, "3rd Generation Partnership Project; Technical Specification Group Radio Access Network; Evolved Universal Terrestrial Radio Access (E-UTRA), Medium Access Control (MAC) protocol specification (Release 12)," Sep. 2015, 77 pages.
ASUSTeK, "Miscellaneous Corrections to the running ProSe MAC CR," R2-150359, Agenda Item 6.2.3.2, 3GPP TSG-RAN2 Meeting #89, Athens, Greece, Feb. 9-13, 2015, 3 pages.
ASUSTeK, "PC5 interface—ProSe Communication," R2-145067, Agenda Item: 7.3.3.2, 3GPP TSG-RAN2 Meeting #88, San Francisco, US, Nov. 17-21, 2014, 2 pages.
Canadian Office Action, dated Oct. 29, 2021, for Canadian Application No. 3,000,752, 3 pages.
Chinese Office Action, issued Sep. 29, 2021, for Chinese Application No. 201580083985.1, 21 pages. (with English Translation).
English Translation of Notice of Reasons for Rejection, dated Jun. 18, 2019, for corresponding Japanese Application No. 2018-517136, 6 pages.
ETSI TS 136 321 v12.7.0, "LTE; Evolved Universal Terrestrial Radio Access (E-UTRA); Medium Access Control (MAC) protocol specification (3GPP TS 36.321 version 12.7.0 Release 12," Oct. 2015. (79 Pages).
Extended European Search Report, dated Sep. 28, 2018, for European Application No. 15907640.5, 3 pages.
International Search Report, dated Aug. 17, 2016, for related International Patent Application No. PCT/CN2015/093960, 2 pages.
Japanese Office Action, dated Sep. 23, 2020, for Japanese Application No. 2019-210503, 7 pages. (with English machine translation).
Korean Office Action, issued Aug. 29, 2022, for Korean Patent Application No. 10-2018-7011216. (9 pages) (with English Translation).
Kyocera, "Multiple transmissions to different destinations from the UE-to-Network Relay," R1-154010, Agenda Item: 7.2.3.1.3, 3GPP TSG RAN WG1 Meeting #82, Beijing, China, Aug. 24-28, 2015. (10 pages).
Lee et al., "Efficient SLSS and PSBCH Transmission for PSDCH", U.S. Appl. No. 621547347 filed on Apr. 30, 2015 (Year: 2015).
LG Electronics et al., "WF on D2D Demodulation with Multiple sidelinks," R4-153676, 3GPP TSG-RAN WG4 Meeting #75, Agenda Item: 6.5.2, Fukuoka, Japan, May 25-29, 2015, 7 pages.
LG Electronics Inc., "BSR and LCP supporting ProSe priorities," R2-153166, 3GPP TSG-RAN WG2 Meeting #91, Agenda item: 7.5.4 (LTE_eD2D_Prox-Core), Beijing, China, Aug. 24-28, 2015, 3 pages.
LG Electronics Inc., "Support of multiple SC transmissons," R2-154576, Agenda item: 7.5.1.4, 3GPP TSG-RAN WG2 #91bis, Malmo, Sweden, Oct. 5-9, 2015, 2 pages.
Office Action, dated Mar. 26, 2019, for corresponding Columbian Patent Application No. NC2018/0003953, 21 pages.
Panasonic, "LCP procedure for ProSe communication," R2-153258, Agenda Item: 7.5.4, 3GPP TSG RAN WG2 Meeting #91, Beijing, China, Aug. 24-28, 2015, 2 pages.
Panasonic, "Multiple SA transmissions during one SC period," R2-153259, 3GPP TSG RAN WG2 Meeting #91, Beijing, China, Aug. 24-28, 2015, 3 pages.
Qualcomm Incorporated et al., "Priority handling for Sidelink Direct Communication," R2-154799, Agenda item: 7.5.4, 3GPP TSG-RAN WG2 Meeting #91Bis, Malmo, Sweden, Oct. 5-9, 2015. (5 pages).
Sesia et al., "LTE The UMTS Long Term Evolution—From Theory to Practice," John Wiley & Sons Ltd., 2011, 22 pages.
Yi et al., "Selecting Multiple SL Grants for Multiple Prose Groups", U.S. Appl. No. 62/244,192, filed Oct. 21, 2015 (Year: 2015).

* cited by examiner (Pior Art)

(Pior Art)

(Pior Art)

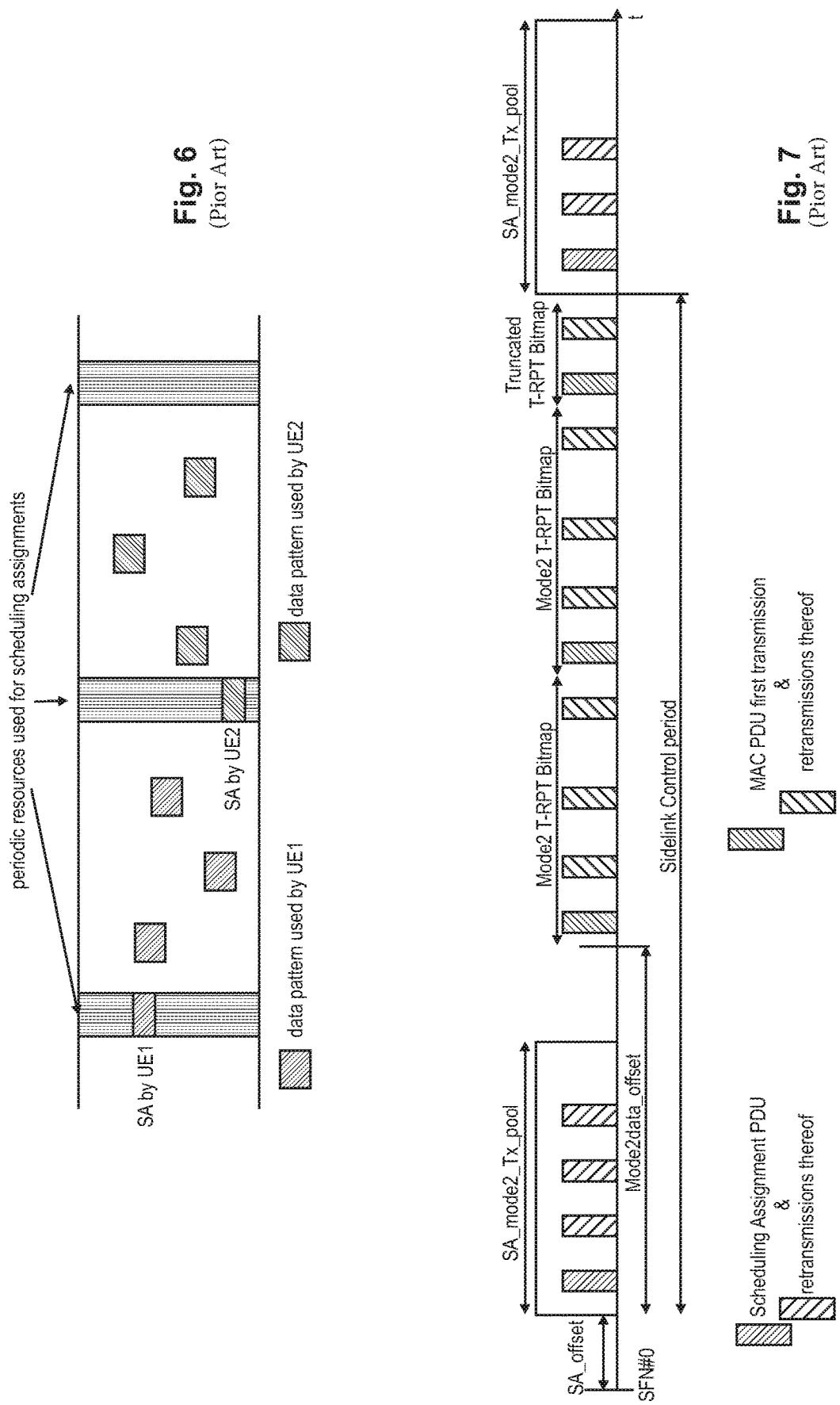

(Pior Art)

(Pior Art)

(Pior Art)

| Group index₁ | LCG ID₁ | Buffer Size₁ | Oct 1 |
| Buffer Size₁ | Group index₂ | | Oct 2 |
| LCG ID₂ | Buffer Size₂ | | Oct 3 |
| ... | | | |
| Group index_{N-1} | LCG ID_{N-1} | Buffer Size_{N-1} | Oct 1.5*N-2 |
| Buffer Size_{N-1} | Group index_N | | Oct 1.5*N-1 |
| LCG ID_N | Buffer Size_N | | Oct 1.5*N |

(Pior Art)

(Pior Art)

MULTIPLE SIDELINK CONTROL TRANSMISSIONS DURING A SIDELINK CONTROL PERIOD

BACKGROUND

Technical Field

The present disclosure relates to allocation mechanisms of radio resources to a transmitting user equipment to perform multiple direct sidelink transmissions during a sidelink period over a sidelink interface to one or more receiving user equipments. In this respect, the present disclosure defines methods for the allocation mechanism and also user equipments applying the allocation mechanism described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeB s are interconnected with each other by means of the X2 interface.

The eNodeB s are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $NB_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

The characteristics of the downlink and uplink PCell are:

For each SCell the usage of uplink resources by the UE in addition to the downlink ones is configurable (the number of DL SCCs configured is therefore always larger or equal to the number of UL SCCs, and no SCell can be configured for usage of uplink resources only)

The downlink PCell cannot be de-activated, unlike SCells

Re-establishment is triggered when the downlink PCell experiences Rayleigh fading (RLF), not when downlink SCells experience RLF Non-access stratum information is taken from the downlink PCell PCell can only be changed with handover procedure (i.e., with security key change and RACH procedure)

PCell is used for transmission of PUCCH

The uplink PCell is used for transmission of Layer 1 uplink control information

From a UE viewpoint, each uplink resource only belongs to one serving cell

The configuration and reconfiguration, as well as addition and removal, of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier'. Same applies also for the uplink.

When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, Node B assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (Node B), aided by insertion of a cyclic prefix in the transmitted signal.

The basic physical resource used for data transmission consists of a frequency resource of size BWgrant during one time interval, e.g., a subframe of 0.5 ms, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

UL Scheduling Scheme for LTE

The uplink scheme in LTE allows for both scheduled access, i.e., controlled by eNB, and contention-based access.

In case of scheduled access, the UE is allocated by the eNB a certain frequency resource for a certain time (i.e., a time/frequency resource) for uplink data transmission. Some time/frequency resources can be allocated for contention-based access, within which the UEs can transmit without first being scheduled by the eNB. One scenario where UE is making a contention-based access is for example the random access, i.e., when UE is performing an initial access to a cell or for requesting uplink resources.

For the scheduled access the Node B scheduler assigns a user a unique frequency/time resource for uplink data transmission. More specifically the scheduler determines which UE(s) is (are) allowed to transmit, which physical channel resources, Transport format (Modulation Coding Scheme, MCS) to be used by the mobile terminal for the transmission The allocation information is then signaled to the UE via a scheduling grant, sent on the L1/L2 control channel. For simplicity reasons this channel is called uplink grant channel in the following. Correspondingly, a scheduling grant message contains information which part of the frequency band the UE is allowed to use, the validity period of the grant, and the transport format the UE has to use for the upcoming uplink transmission. The shortest validity period is one sub-frame. Additional information may also be included in the grant message, depending on the selected scheme. Only "per UE" grants are used to grant the right to transmit on the UL-SCH (i.e., there are no "per UE per RB" grants). Therefore, the UE needs to distribute the allocated resources among the radio bearers according to some rules. Unlike in HSUPA, there is no UE-based transport format selection. The eNB decides the transport format based on some information, e.g., reported scheduling information and QoS info, and the UE has to follow the selected transport format. In HSUPA the Node B assigns the maximum uplink resource, and the UE selects accordingly the actual transport format for the data transmissions.

Since the scheduling of radio resources is the most important function in a shared-channel access network for determining Quality of Service, there are a number of requirements that should be fulfilled by the UL scheduling scheme for LTE in order to allow for an efficient QoS management.

- Starvation of low priority services should be avoided
- Clear QoS differentiation for radio bearers/services should be supported by the scheduling scheme
- The UL reporting should allow fine granular buffer reports (e.g., per radio bearer or per radio bearer group) in order to allow the eNB scheduler to identify for which Radio Bearer/service data is to be sent.
- It should be possible to make clear QoS differentiation between services of different users
- It should be possible to provide a minimum bit rate per radio bearer As can be seen from above list, one essential aspect of the LTE scheduling scheme is to provide mechanisms with which the operator can control the partitioning of its aggregated cell capacity between the radio bearers of the different QoS classes. The QoS class of a radio bearer is identified by the QoS profile of the corresponding SAE bearer signaled from AGW to eNB as described before. An operator can then allocate a certain amount of its aggregated cell capacity to the aggregated traffic associated with radio bearers of a certain QoS class. The main goal of employing this class-based approach is to be able to differentiate the treatment of packets depending on the QoS class they belong to.

Layer 1/Layer 2 Control Signaling

In order to inform the scheduled users about their allocation status, transport format, and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH. Furthermore, 3GPP Release 11 introduced an EPDCCH that fulfills basically the same function as the PDCCH, i.e., conveys L1/L2 control signaling, even though the detailed transmission methods are different from the PDCCH. Further details can be found in the current versions of 3GPP TS 36.211 and 36.213, incorporated herein by reference. Consequently, most items outlined in the background and the embodiments apply to PDCCH as well as EPDCCH, or other means of conveying L1/L2 control signals, unless specifically noted.

Generally, the information sent in the L1/L2 control signaling for assigning uplink or downlink radio resources (particularly LTE(-A) Release 10) can be categorized to the following items:

- User identity, indicating the user that is allocated. This is typically included in the checksum by masking the CRC with the user identity;
- Resource allocation information, indicating the resources (e.g., Resource Blocks, RBs) on which a user is allocated. Alternatively this information is termed resource block assignment (RBA). Note, that the number of RBs on which a user is allocated can be dynamic;
- Carrier indicator, which is used if a control channel transmitted on a first carrier assigns resources that concern a second carrier, i.e., resources on a second carrier or resources related to a second carrier; (cross carrier scheduling);
- Modulation and coding scheme that determines the employed modulation scheme and coding rate;
- HARQ information, such as a new data indicator (NDI) and/or a redundancy version (RV) that is particularly useful in retransmissions of data packets or parts thereof;
- Power control commands to adjust the transmit power of the assigned uplink data or control information transmission;
- Reference signal information such as the applied cyclic shift and/or orthogonal cover code index, which are to be employed for transmission or reception of reference signals related to the assignment;
- Uplink or downlink assignment index that is used to identify an order of assignments, which is particularly useful in TDD systems;
- Hopping information, e.g., an indication whether and how to apply resource hopping in order to increase the frequency diversity;
- CSI request, which is used to trigger the transmission of channel state information in an assigned resource; and
- Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding", section 5.3.3.1 (current version v12.4.0 available at http://www.3gpp.org and incorporated herein by reference). In addition, for further information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3, incorporated herein by reference.

- Format 0: DCI Format 0 is used for the transmission of resource grants for the PUSCH, using single-antenna port transmissions in uplink transmission mode 1 or 2.
- Format 1: DCI Format 1 is used for the transmission of resource assignments for single codeword PDSCH transmissions (downlink transmission modes 1, 2 and 7).
- Format 1A: DCI Format 1A is used for compact signaling of resource assignments for single codeword PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

Format 5: DCI format 5 is used for the scheduling of the PSCCH (Physical Sidelink Control Channel), and also contains several SCI format 0 fields used for the scheduling of the PSSCH (Physical Sidelink Shared Control Channel). If the number of information bits in DCI format 5 mapped onto a given search space is less than the payload size of format 0 for scheduling the same serving cell, zeros shall be appended to format 5 until the payload size equals that of format 0 including any padding bits appended to format 0.

The 3GPP technical standard TS 35.212, current version 12.4.0, defines in subclause 5.4.3, incorporated herein by reference, control information for the sidelink; for detailed information on sidelink see later.

SCI may transport sidelink scheduling information for one destination ID. SCI Format 0 is defined for use for the scheduling of the PSSCH. The following information is transmitted by means of the SCI format 0:

Frequency hopping flag—1 bit.
Resource block assignment and hopping resource allocation
Time resource pattern—7 bits.
Modulation and coding scheme—5 bits
Timing advance indication—11 bits
Group destination ID—8 bits Logical Channel Prioritization, LCP, Procedure For the uplink the process by which a UE creates a MAC PDU to transmit using the allocated radio resources is fully standardized; this is designed to ensure that the UE satisfies the QoS of each configured radio bearer in a way which is optimal and consistent between different UE implementations. Based on the uplink transmission resource grant message signaled on the PDCCH, the UE has to decide on the amount of data for each logical channel to be included in the new MAC and, if necessary, also to allocate space for a MAC Control Element.

In constructing a MAC PDU with data from multiple logical channels, the simplest and most intuitive method is the absolute priority-based method, where the MAC PDU space is allocated to logical channels in decreasing order of logical channel priority. This is, data from the highest-priority logical channel are served first in the MAC PDU, followed by data from the next highest-priority logical channel, continuing until the MAC PDU space runs out. Although the absolute priority-based method is quite simple in terms of UE implementation, it sometimes leads to starvation of data from low-priority logical channels; starvation means that the data from the low-priority logical channels cannot be transmitted because the data from high-priority logical channels take up all the MAC PDU space.

In LTE, a Prioritized Bit Rate (PBR) is defined for each logical channel so as to transmit data in the order of importance but also to avoid starvation of data with lower priority. The PBR is the minimum data rate guaranteed for the logical channel. Even if the logical channel has low priority, at least a small amount of MAC PDU space is allocated to guarantee the PBR. Thus, the starvation problem can be avoided by using the PBR.

Constructing a MAC PDU with PBR consists of two rounds. In the first round, each logical channel is served in a decreasing order of logical channel priority, but the amount of data from each logical channel included in the MAC PDU is initially limited to the amount corresponding to the configured PBR value of the logical channel. After all logical channels have been served up to their PBR values, if there is room left in the MAC PDU, the second round is performed. In the second round, each logical channel is served again in decreasing order of priority. The major difference for the second round compared to the first round is that each logical channel of lower priority can be allocated with MAC PDU space only if all logical channels of higher priority have no more data to transmit.

A MAC PDU may include not only the MAC SDUs from each configured logical channel but also a MAC CE. Except for a Padding BSR, the MAC CE has a higher priority than a MAC SDU from the logical channels because it controls the operation of the MAC layer. Thus, when a MAC PDU is composed, the MAC CE, if it exists, is the first to be included, and the remaining space is used for MAC SDUs from the logical channels. Then, if additional space is left and it is large enough to include a BSR, a Padding BSR is triggered and included in the MAC PDU. The Logical Channel Prioritization (LCP) procedure is applied every time a new transmission is performed.

The Logical Channel Prioritization is standardized e.g., in 3GPP TS 36.321 (current version v12.5.0) in subclause 5.4.3.1 incorporated herein by reference.

RRC controls the scheduling of uplink data by signaling for each logical channel:
 priority where an increasing priority value indicates a lower priority level,
 prioritisedBitRate which sets the Prioritized Bit Rate (PBR),
 bucketSizeDuration which sets the Bucket Size Duration (BSD).

The UE shall maintain a variable Bj for each logical channel j. Bj shall be initialized to zero when the related logical channel is established, and incremented by the product PBR×TTI duration for each TTI, where PBR is the Prioritized Bit Rate of logical channel j. However, the value of Bj can never exceed the bucket size, and if the value of Bj is larger than the bucket size of logical channel j, it shall be set to the bucket size. The bucket size of a logical channel is equal to PBR×BSD, where PBR and BSD are configured by upper layers.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market and will, at the same time, serve the urgent needs of several Public Safety communities that are jointly committed to LTE.

Device-to-Device (D2D) communication is a technology component for LTE-Rel.12. The Device-to-Device (D2D) communication technology allows D2D as an underlay to the cellular network to increase the spectral efficiency. For example, if the cellular network is LTE, all data carrying physical channels use SC-FDMA for D2D signaling. In D2D communications, user equipments transmit data signals to each other over a direct link using the cellular resources instead of through the radio base station. Throughout the invention the terms "D2D", "ProSe" and "sidelink" are interchangeable.

D2D Communication in LTE

The D2D communication in LTE is focusing on two areas: Discovery and Communication.

ProSe (Proximity based Services) Direct Discovery is defined as the procedure used by the ProSe-enabled UE to discover other ProSe-enabled UE(s) in its proximity using E-UTRA direct radio signals via the PC5 interface. FIG. 3 schematically illustrates a PC5 interface for device-to-device direct discovery. FIG. 4 schematically illustrates a Radio Protocol Stack (AS) for ProSe Direct Discovery.

In D2D communication UEs transmit data signals to each other over a direct link using the cellular resources instead of through the base station (BS). D2D users communicate directly while remaining controlled under the BS, i.e., at least when being in coverage of an eNB. Therefore, D2D can improve system performances by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

With respect to the User plane protocols, in the following part of the agreement from D2D communication perspective is given (see also 3GPP TR 36.843 current version 12.0.1 section 9.2.2, incorporated herein by reference):

PDCP:
  1:M D2D broadcast communication data (i.e., IP packets) should be handled as the normal user-plane data.
  Header-compression/decompression in PDCP is applicable for 1:M D2D broadcast communication.
   U-Mode is used for header compression in PDCP for D2D broadcast operation for public safety;
 RLC:
  RLC UM is used for 1:M D2D broadcast communication.
  Segmentation and Re-assembly is supported on L2 by RLC UM.
  A receiving UE needs to maintain at least one RLC UM entity per transmitting peer UE.
  An RLC UM receiver entity does not need to be configured prior to reception of the first RLC UM data unit.
  So far no need has been identified for RLC AM or RLC TM for D2D communication for user plane data transmission.
 MAC:
  No HARQ feedback is assumed for 1:M D2D broadcast communication
  The receiving UE needs to know a source ID in order to identify the receiver RLC UM entity.
  The MAC header comprises a L2 target ID which allows filtering out packets at MAC layer.
  The L2 target ID may be a broadcast, group cast or unicast address.
   L2 Groupcast/Unicast: A L2 target ID carried in the MAC header would allow discarding a received RLC UM PDU even before delivering it to the RLC receiver entity.
   L2 Broadcast: A receiving UE would process all received RLC PDUs from all transmitters and aim to re-assemble and deliver IP packets to upper layers.
  MAC sub header contains LCIDs (to differentiate multiple logical channels).
  At least Multiplexing/de-multiplexing, priority handling and padding are useful for D2D.

ProSe Direct Communication Related Identities

3GPP TS 36.300 current version 12.5.0 defines in subclause 8.3 the following identities to use for ProSe Direct Communication:
 SL-RNTI: (SideLink-Radio Network Temporary Identifier) Unique identification used for ProSe Direct Communication Scheduling;
 Source Layer-2 ID: Identifies the sender of the data in sidelink ProSe Direct Communication. The Source Layer-2 ID is 24 bits long and is used together with ProSe Layer-2 Destination ID and LCID for identification of the RLC UM entity and PDCP entity in the receiver;

Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to physical layer as Sidelink Control Layer-1 ID. This identifies the target of the intended data in Sidelink Control and is used for filtering of packets at the physical layer.

Second bit string is the MSB part (16 bits) of the Destination Layer-2 ID and is carried within the MAC header. This is used for filtering of packets at the MAC layer.

Non-Access Stratum signaling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer.

Radio Resource Allocation for Proximity Services

From the perspective of a transmitting UE, a Proximity-Services-enabled UE (ProSe-enabled UE) can operate in two modes for resource allocation:

On the one hand, Mode 1 refers to the eNB-scheduled resource allocation, where the UE requests transmission resources from the eNB (or Release-10 relay node), and the eNodeB (or Release-10 relay node) in return schedules the resources for use by a UE to transmit direct data and direct control information, DCI (e.g., Scheduling Assignment). The UE needs to be RRC_CONNECTED in order to transmit data. In particular, the UE sends a D2D scheduling request (D-SR or Random Access) to the eNB followed by a buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection, where a UE on its own selects resources (time and frequency) from resource pool(s) to transmit direct data and direct control information (i.e., SA). One resource pool is defined e.g., by the content of SIB18, namely by the field commTxPoolNormalCommon, this particular resource pool being broadcast in the cell and then commonly available for all UEs in the cell still in RRC_Idle state. Effectively, the eNB may define up to four different instances of said pool, respectively four resource pools for the transmission of SA messages and direct data. However, a UE shall always use the first resource pool defined in the list, even if it was configured with multiple resource pools.

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e., RRC_IDLE or RRC_CONNECTED, and the coverage state of the UE, i.e., in-coverage, out-of-coverage. A UE is considered in-coverage if it has a serving cell (i.e., the UE is RRC_CONNECTED or is camping on a cell in RRC_IDLE).

The following rules with respect to the resource allocation mode apply for the UE:

If the UE is out-of-coverage, it can only use Mode 2; If the UE is in-coverage, it may use Mode 1 if the eNB configures it accordingly;

If the UE is in-coverage, it may use Mode 2 if the eNB configures it accordingly;

When there are no exceptional conditions, UE may change from Mode 1 to Mode 2 or vice-versa only if it is configured by eNB to do so. If the UE is in-coverage, it shall use only the mode indicated by eNB configuration unless one of the exceptional cases occurs;

The UE considers itself to be in exceptional conditions e.g., while T311 or T301 is running;

When an exceptional case occurs the UE is allowed to use Mode 2 temporarily even though it was configured to use Mode 1.

While being in the coverage area of an E-UTRA cell, the UE shall perform ProSe Direct Communication Transmission on the UL carrier only on the resources assigned by that cell, even if resources of that carrier have been pre-configured e.g., in UICC (Universal Integrated Circuit Card).

For UEs in RRC_IDLE the eNB may select one of the following options:

The eNB may provide a Mode 2 transmission resource pool in SIB. UEs that are authorized for ProSe Direct Communication use these resources for ProSe Direct Communication in RRC_IDLE;

The eNB may indicate in SIB that it supports D2D but does not provide resources for ProSe Direct Communication. UEs need to enter RRC_CONNECTED to perform ProSe Direct Communication transmission.

For UEs in RRC_CONNECTED:

A UE in RRC_CONNECTED that is authorized to perform ProSe Direct Communication transmission, indicates to the eNB that it wants to perform ProSe Direct Communication transmissions when it needs to perform a ProSe Direct Communication transmission;

The eNB validates whether the UE in RRC_CONNECTED is authorized for ProSe Direct Communication transmission using the UE context received from the MME;

The eNB may configure a UE in RRC_CONNECTED by dedicated signaling with a Mode-2 resource allocation transmission resource pool that may be used without constraints while the UE is RRC_CONNECTED. Alternatively, the eNB may configure a UE in RRC_CONNECTED by dedicated signaling with a Mode 2 resource allocation transmission resource pool which the UE is allowed to use only in exceptional cases and to rely on Mode 1 otherwise.

The resource pool for Scheduling Assignment when the UE is out-of-coverage can be configured as below:

The resource pool used for reception is pre-configured.

The resource pool used for transmission is pre-configured.

The resource pool for Scheduling Assignment when the UE is in coverage can be configured as below:

The resource pool used for reception is configured by the eNB via RRC, in dedicated or broadcast signaling.

The resource pool used for transmission is configured by the eNB via RRC if Mode 2 resource allocation is used The SCI (Sidelink Control Information) resource pool (also referred to as Scheduling Assignment, SA, resource pool) used for transmission is not known to the UE if Mode 1 resource allocation is used.

The eNB schedules the specific resource(s) to use for Sidelink Control Information (Scheduling Assignment) transmission if Mode 1 resource allocation is used. The specific resource assigned by the eNB is within the resource pool for reception of SCI that is provided to the UE.

FIG. 5 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, in the current state-of-the-art, it uses the corresponding resources only for the corresponding transmission/reception. For example, in FIG. 5 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 5 can be used for LTE (overlay) transmissions and/or reception.

Transmission Procedure for D2D Communication

The D2D data transmission procedure differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e., resource pool) are provided; this may be done e.g., with the exchange of the D2D communication Interest Indication by the UE and the corresponding response, D2D Communication Response, where the corresponding exemplary Prose-CommConfig information element mentioned above would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;

Step 2: eNB grants UL resource (for UE to send BSR) via PDCCH, scrambled by C-RNTI;

Step 3: UE sends D2D BSR indicating the buffer status via PUSCH;

Step 4: eNB grants D2D resource (for UE to send data) via PDCCH, scrambled by SL-RNTI.

Step 5: D2D Tx UE transmits SA/D2D data according to grant received in step 4.

A Scheduling Assignment (SA), also termed SCI (Sidelink Control Information) is a compact (low-payload) message containing control information, e.g., pointer(s) to time-frequency resources, modulation and coding scheme and Group Destination ID for the corresponding D2D data transmission. An SCI transports the sidelink scheduling information for one (ProSE) destination ID. The content of the SA (SCI) is basically in accordance with the grant received in Step 4 above. The D2D grant and SA content (i.e., SCI content) are defined in the 3GPP technical standard TS 36.212, current version 12.4.0, subclause 5.4.3, incorporated herein by reference, defining in particular the SCI format 0 as mentioned before in this background section.

On the other hand, for Mode 2 resource allocation, above steps 1-4 are basically not necessary, and the UE autonomously selects resources for the SA and D2D data transmission from the transmission resource pool(s) configured and provided by the eNB.

FIG. 6 exemplarily illustrates the transmission of the Scheduling Assignment and the D2D data for two UEs, UE-A and UE-B, where the resources for sending the scheduling assignments are periodic, and the resources used for the D2D data transmission are indicated by the corresponding Scheduling Assignment.

FIG. 7 illustrates the D2D communication timing for Mode 2, autonomous scheduling, during one SA/data period, also known as SC period, Sidelink Control period. FIG. 8 illustrates the D2D communication timing for Mode 1, eNB-scheduled allocation during one SA/data period. A SC period is the time period consisting of transmission of a Scheduling Assignment and its corresponding data.

As can be seen from FIG. 7, the UE transmits after an SA-offset time, a Scheduling Assignment using the transmission pool resources for scheduling assignments for Mode 2, SA_Mode2_Tx_pool. The 1st transmission of the SA is followed e.g., by three retransmissions of the same SA message. Then, the UE starts the D2D data transmission, i.e., more in particular using a time resource pattern of transmission, i.e., T-RPT bitmap/pattern, at some configured offset (Mode2data_offset) after the first subframe of the SA resource pool (given by the SA_offset).

One D2D data transmission of a MAC PDU consists of its 1st transmissions and several retransmissions. For the illustration of FIG. 7 (and of FIG. 8) it is assumed that three retransmissions are performed (i.e., 2nd, 3rd, and 4th transmission of the same MAC PDU). The Mode2 T-RPT Bitmap (time resource pattern of transmission, T-RPT) basically defines the timing of the MAC PDU transmission (1st transmission) and its retransmissions (2nd, 3rd, and 4th transmission).

During one SA/data period, the UE can transmit multiple transport blocks (only one per subframe (TTI), i.e., one after the other), however to only one ProSe destination group. Also the retransmissions of one transport block must be finished before the first transmission of the next transport block starts, i.e., only one HARQ process is used for the transmission of the multiple transport blocks.

As apparent from FIG. 8, for the eNB-scheduled resource allocation mode (Mode 1), the D2D data transmission, i.e., more in particular the T-RPT pattern/bitmap, starts in the next UL subframe after the last SA transmission repetition in the SA resource pool. As explained already for FIG. 7, the Model T-RPT Bitmap (time resource pattern of transmission, T-RPT) basically defines the timing of the MAC PDU transmission (1st transmission) and its retransmissions (2nd, 3rd, and 4th transmission).

ProSe Network Architecture and ProSe Entities

FIG. 9 illustrates a high-level exemplary architecture for a non-roaming case, including different ProSe applications in the respective UEs A and B, as well as a ProSe Application Server and ProSe function in the network. The example architecture of FIG. 9 is taken from TS 23.303 v.12.4.0 chapter 4.2 "Architectural Reference Model" incorporated herein by reference.

The functional entities are presented and explained in detail in TS 23.303, subclause 4.4 titled "Functional Entities" which is incorporated herein by reference. The ProSe function is the logical function that is used for network-related actions required for ProSe and plays different roles for each of the features of ProSe. The ProSe function is part of the 3GPP's evolved packet core, EPC, and provides all relevant network services like authorization, authentication, data handling etc. related to proximity services.

For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with necessary parameters in order to use ProSe Direct Discovery and ProSe Direct Communication.

The term "UE" used in said connection refers to a ProSe-enabled UE supporting ProSe functionality, such as:
- Exchange of ProSe control information between ProSe-enabled UE and the ProSe Function over PC3 reference point.
- Procedures for open ProSe Direct Discovery of other ProSe-enabled UEs over PC5 reference point.
- Procedures for one-to-many ProSe Direct Communication over PC5 reference point.
- Procedures to act as a ProSe UE-to-Network Relay. The Remote UE communicates with the ProSe UE-to-Network Relay over PC5 reference point. The ProSe UE-to-Network Relay uses layer-3 packet forwarding.
- Exchange of control information between ProSe UEs over PC5 reference point, e.g., for UE-to-Network Relay detection and ProSe Direct Discovery.
- Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function.
- Configuration of parameters (e.g., including IP addresses, ProSe Layer-2 Group IDs, Group security material, radio resource parameters). These parameters can be pre-configured in the UE, or, if in coverage, provisioned by signaling over the PC3 reference point to the ProSe Function in the network.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via PC2 reference point.

UE Coverage States for D2D

As already mentioned before, the resource allocation method for D2D communication depends, apart from the RRC state, i.e., RRC_IDLE and RRC_CONNECTED, also on a coverage state of the UE, i.e., in-coverage, out-of-coverage. A UE is considered in-coverage if it has a serving cell (i.e., the UE is RRC_CONNECTED or is camping on a cell in RRC_IDLE).

The two coverage states mentioned so far, i.e., in-coverage (IC) and out-of-coverage (OOC), are further distinguished into sub-states for D2D. FIG. 10 shows the four different states a D2D UE can be associated to, which can be summarized as follows:
- State 1: UE1 has uplink and downlink coverage. In this state the network controls each D2D communication session. Furthermore, the network configures whether UE1 should use resource allocation Mode 1 or Mode 2.
- State 2: UE2 has downlink but no uplink coverage, i.e., only DL coverage. The network broadcasts a (contention-based) resource pool. In this state the transmitting UE selects the resources used for SA and data from a resource pool configured by the network; resource allocation is only possible according to Mode 2 for D2D communication in such a state.
- State 3: UE3 has no uplink and downlink coverage, accordingly, the UE3 is considered as out-of-coverage (OOC). However, UE3 is in coverage of some UEs which themselves (e.g., UE1) are in coverage of the cell, i.e., those UEs can be also referred as CP-relay UEs. Therefore, the area of the state-3 UEs in FIG. 10 can be denoted as CP UE-relay coverage area. UEs in this state 3 are also referred to as OOC-state-3 UEs. In this state the UEs receive some cell specific information which is sent by the eNB (SIB) and forwarded by the CP UE-relay UEs in the coverage of the cell via PD2DSCH to the OOC-state-3 UEs. A (contention-based) network-controlled resource pool is signaled by PD2DSCH.
- State 4: UE4 is out of coverage and does not receive PD2DSCH from other UEs which are in the coverage of a cell. In this state, which is also referred to as state-4 OOC, the transmitting UE selects the resources used for the data transmission from a (contention-based) pre-configured resource pool.

The reason for distinguishing between state-3 OOC and state-4 OOC is mainly to avoid potential interference between D2D transmissions from out-of coverage devices and legacy E-UTRA transmissions. In general, D2D-capable UEs will have preconfigured resource pool(s) for transmission of D2D SAs and data for use while out of coverage. If these out-of-coverage UEs transmit on these preconfigured resource pools at the cell boundaries, then, interference between the D2D transmissions and in-coverage legacy transmissions can have a negative impact on communications within the cell.

If D2D-enabled UEs within coverage forward the D2D resource pool configuration to those out-of-coverage devices near the cell boundary, then, the out-of-coverage UEs can restrict their transmissions to the resources specified by the eNode B and therefore minimize interference with legacy transmissions in coverage. Thus, RAN1 has introduced a mechanism where in-coverage UEs are forwarding resource pool information and other D2D related configurations to those devices just outside the coverage area (state-3 UEs). The Physical D2D synchronization channel (PD2DSCH) is used to carry this information about in-coverage D2D resource pools to the UEs in network proximity, so that resource pools within network proximity are aligned.

LCP Procedure for D2D, Sidelink Logical Channels

The LCP procedure for D2D will be different from the above-presented LCP procedure for "normal" LTE data. The following information is taken from TS 36.321, version 12.5.0, subclause 5.14.1.3.1 describing LCP for ProSe; which is incorporated herewith in its entirety by reference.

The UE shall perform the following Logical Channel Prioritization procedure when a new transmission is performed:
- The UE (e.g., MAC entity) shall allocate resources to the sidelink logical channels according to the following rules:

the UE should not segment an RLC SDU (or partially transmitted SDU) if the whole SDU (or partially transmitted SDU) fits into the remaining resources;

if the UE segments an RLC SDU from the sidelink logical channel, it shall maximize the size of the segment to fill the grant as much as possible;

the UE should maximize the transmission of data.

if the UE is given an sidelink grant size that is equal to or larger than 10 bytes while having data available for transmission, the UE shall not transmit only padding.

NOTE: The rules above imply that the order by which the sidelink logical channels are served is left for UE implementation.

Generally, for one PDU, a MAC entity shall consider only logical channels with the same Source Layer-2ID— Destination Layer 2 ID pairs, i.e., for one PDU, the MAC entity in the UE shall consider only logical channels of the same ProSe destination group, i.e., having a same destination group ID. The UE selects a ProSe destination group during the LCP procedure. Furthermore, in Rel-12 during one SA/data period the D2D transmitting UE can only transmit data to one ProSe destination group.

All D2D (sidelink) logical channels, e.g., STCH, Sidelink Traffic CHannel, are allocated to the same logical channel group (LCG), namely with LCGID set to '11' (see subclause 5.14.1.4 "Buffer Status Reporting" of TS 36.321 version 12.5.0). In Rel-12 there is no prioritization mechanism for D2D (sidelink) logical channels/groups. Essentially, all sidelink logical channels have the same priority from UE point of view, i.e., the order by which the sidelink logical channels are served is left for UE implementation.

For Rel-13 a more advanced prioritization mechanism is considered where each sidelink logical channel is associated with a logical channel priority, also referred to as PPPP (ProSe per packet priority). Based on this logical channel priority the UE selects the ProSe destination group for a given sidelink grant, i.e., highest priority logical channel determines the ProSe destination group, and further allocates resources to the logical channels belonging to the selected ProSe destination group (in decreasing priority order).

For illustration purposes only, the following exemplary scenario is considered where three ProSe logical channels, LCH #1, LCH #2, and LCH #3, are set up in the user equipment, and all three are associated with the same ProSe LCG (e.g., "11"). It is exemplarily assumed that LCH #1 and LCH #2 are assigned to ProSe destination group 1, and LCH #3 is assigned to ProSe destination group 2. This is depicted in FIG. 12.

Buffer Status Reporting for ProSe

Also the buffer status reporting is adapted to ProSe, and at present is defined in TS 36.321 in its version 12.5.0, subclause 5.14.1.4 "Buffer Status Reporting" incorporated herein by reference for Rel-12.

The (D2D) sidelink Buffer Status Reporting procedure is used to provide the serving eNB with information about the amount of sidelink data available for transmission in the sidelink buffers of the UE. RRC controls sidelink BSR reporting by configuring the two timers Periodic-ProseBSR-Timer and RetxProseBSR-Timer. Each sidelink logical channel (STCH) is allocated to an LCG with LCGID set to "11" and belongs to a ProSe Destination group.

A sidelink Buffer Status Report (BSR) shall be triggered if some particular events occurs, as specified in detail in TS 36.321, subclause 5.14.1.4.

Furthermore, TS 36.321 in its version 12.5.0, subclause 6.1.3.1a, incorporated herein by reference, defines the ProSe BSR MAC Control Elements and its corresponding content as follows. The ProSe Buffer Status Report (BSR) MAC control element consists of one group index field, one LCG ID field and one corresponding Buffer Size field per reported D2D destination group. In more detail, for each included ProSe destination group, the following fields are defined:

Group index: The group index field identifies the ProSe destination group. The length of this field is 4 bits. The value is set to the index of the destination identity reported in destinationInfoList;

LCG ID: The Logical Channel Group ID field identifies the group of logical channel(s) which buffer status is being reported. The length of the field is 2 bits and it is set to "11";

Buffer Size: The Buffer Size field identifies the total amount of data available across all logical channels of a ProSe Destination group after all MAC PDUs for the TTI have been built. The amount of data is indicated in number of bytes R: Reserved bit, set to "0".

FIG. 11 shows the ProSe BSR MAC control element for even N (number of ProSe destination groups), taken from TS 36.321 subclause 6.1.3.1a.

As has been explained above, the transmission scheme for device-to-device communication is different from the normal LTE scheme, including the use of ProSe destination groups to identify the possible content of the data. Some of currently-defined mechanisms are rather inefficient.

BRIEF SUMMARY

Non-limiting and exemplary embodiments provide improved methods for allocating radio resources for a transmitting user equipment to perform a plurality of direct sidelink, SL transmissions over a sidelink interface to one or more receiving user equipments. The independent claims provide non-limiting and exemplary embodiments. Advantageous embodiments are subject to the dependent claims.

According to several aspects, performing direct communication transmissions by a transmitting user equipment is improved (not only for but) particularly for scenarios in which data is available for transmission in the transmitting user equipment destined to more than one sidelink destination group.

In one general first aspect, the techniques disclosed here feature a transmitting user equipment for allocating radio resources to perform a plurality of direct sidelink, SL, transmissions over a SL interface to one or more receiving user equipments in a communication system. The allocation of radio resources within a sidelink control, SC, period is restricted, for the SC period, by a maximum number of SL processes with which a transmitting user equipment is configured. A processor of the transmitting user equipment is adapted to acquire a plurality of SL grants for a subsequent SC period, and to select among the acquired SL grants a number of those SL grants that have most recently been acquired before the start of the subsequent SC period, wherein the number of selected SL grants does not exceed the maximum number of SL processes configured for the one SC period. Further, the processor is adapted to associate a plurality of SL processes for the subsequent SC period such that each of the plurality of SL process is associated with a different one of the selected number of SL grants for allocating radio resources within the subsequent SC period. Even further, the processor is adapted, for each of the plurality of the SL processes, to allocate the radio resources within the subsequent SC period according to the selected SL grant, with which the respective SL process is associated, for performing one of the plurality of SL transmissions to one of one or more of receiving user equipments. Each of the plurality of SL transmissions comprises at least one sidelink control information, SCI, transmission and at least one data transmission over the SL interface.

In one general second aspect, the techniques disclosed here feature a transmitting user equipment for allocating radio resources to perform a plurality of direct sidelink, SL, transmissions over a SL interface to one or more receiving user equipments in a communication system. The allocation of radio resources within a sidelink control, SC, period is restricted, for the SC period, by a maximum number of SL processes with which the transmitting user equipment is configured. A processor is adapted to acquire, for a subsequent SC period, a plurality of sidelink, SL, grants in different sub-frames before the start of the subsequent SC period, wherein: each of the acquired SL grants is associated with one from among the maximum number of SL processes on the basis of the sub-frame in which it is acquired, by applying an association scheme, where: each of the maximum number of SL processes is associated with SL grants from a set of different sub-frames, and each of the sub-frames in the set is offset from one another by a pre-defined number of sub-frames. Further, the processor is adapted to associate each of a plurality of the maximum number of SL processes with that one SL grant, which is acquired in the respective set of different sub-frames and which has most recently been acquired before the start of the subsequent SC period. Even further, the processor is adapted, for each of the plurality of the SL processes, to allocate radio resources within the subsequent SC period according to the SL grant, with which the respective SL process is associated, for performing one of the plurality of SL transmissions to one or more receiving user equipments. Each of the plurality of SL transmissions comprises at least one sidelink control information, SCI, transmission and at least one data transmission over the SL interface.

In one general third aspect, the techniques disclosed here feature a transmitting user equipment for allocating radio resources to perform a plurality of direct sidelink, SL, transmissions within a sidelink control, SC, period over a SL interface to one or more receiving user equipments in a communication system. A processor of the transmitting user equipment is adapted to autonomously select SL grants for a plurality of SL transmission from different resource pools, each being configured and made available for SL transmissions within the communication system. The processor is adapted to associate, for each of the plurality of SL transmissions, a SL grant to a different SL process selected from the different configured resource pools. Further, the processor is adapted to perform, for each of the plurality of SL processes with an associated SL grant, a separate logical channel prioritization, LCP, procedure which only considers logical channels to different destination Group IDs. Even further, the processor is adapted, for each of the plurality of SL processes, to allocate, within the same SC period, the radio resources according to the autonomously selected SL grant with which the respective SL process is associated for performing the plurality of SL transmissions. Each of the plurality of SL transmissions comprises at least one sidelink control information, SCI, transmission and at least one data transmission over the SL interface.

In one general fourth aspect, the techniques disclosed here feature a method for allocating radio resources for a transmitting user equipment to perform a plurality of direct sidelink, SL, transmissions over a SL interface to one or more receiving user equipments in a communication system. The allocation of radio resources within a sidelink control, SC, period is restricted, for the SC period, by a maximum number of SL processes with which a transmitting user equipment is configured. A plurality of SL grants is acquired for a subsequent SC period. Among the acquired SL grants a number of those SL grants is selected that have most recently been acquired before the start of the subsequent SC period, wherein the number of selected SL grants does not exceed the maximum number of SL processes configured for the one SC period. Then, a plurality of SL processes for the subsequent SC period are associated such that each of the plurality of SL process is associated with a different one of the selected number of SL grants for allocating radio resources within the subsequent SC period. Thereafter, for each of the plurality of the SL processes, the radio resources are allocated within the subsequent SC period according to the selected SL grant, with which the respective SL process is associated, for performing one of the plurality of SL transmissions to one of one or more of receiving user equipments. Each of the plurality of SL transmissions comprises at least one sidelink control information, SCI, transmission and at least one data transmission over the SL interface.

In one general fifth aspect, the techniques disclosed here feature a method for allocating radio resources for a transmitting user equipment to perform a plurality of direct sidelink, SL, transmissions over a SL interface to one or more receiving user equipments in a communication system. The allocation of radio resources within a sidelink control, SC, period is restricted, for the SC period, by a maximum number of SL processes with which the transmitting user equipment is configured. For a subsequent SC period, a plurality of sidelink, SL, grants are acquired in different sub-frames before the start of the subsequent SC period, wherein: each of the acquired SL grants is associated with one from among the maximum number of SL processes on the basis of the sub-frame in which it is acquired, by applying an association scheme, where: each of the maximum number of SL processes is associated with SL grants from a set of different sub-frames, and each of the sub-frames in the set is offset from one another by a pre-defined number of sub-frames. Then, each of a plurality of the maximum number of SL processes is associated with that one SL grant, which is acquired in the respective set of different sub-frames and which has most recently been acquired before the start of the subsequent SC period. Thereafter, for each of the plurality of the SL processes, radio resources are allocated within the subsequent SC period according to the SL grant, with which the respective SL process is associated, for performing one of the plurality of SL transmissions to one or more receiving user equipments. Each of the plurality of SL transmissions comprises at least one sidelink control information, SCI, transmission and at least one data transmission over the SL interface.

In one general sixth aspect, the techniques disclosed here feature a method for allocating radio resources for a transmitting user equipment to perform a plurality of direct sidelink, SL, transmissions within a sidelink control, SC, period over a SL interface to one or more receiving user equipments in a communication system. SL grants are autonomously selected for a plurality of SL transmission from different resource pools, each being configured and made available for SL transmissions within the communication system. Then, for each of the plurality of SL transmissions, a SL grant is associated to a different SL process selected from the different configured resource pools. Thereafter, for each of the plurality of SL processes with an associated SL grant, a separate logical channel prioritization, LCP, procedure is performed which only considers logical channels to different destination Group IDs. Finally, for each of the plurality of SL processes, within the same SC period, the radio resources are allocated according to the autonomously selected SL grant with which the respective SL process is associated for performing the plurality of SL transmissions. Each of the plurality of SL transmissions comprises at least one sidelink control information, SCI, transmission and at least one data transmission over the SL interface.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

FIG. 6 illustrates the transmission of the Scheduling Assignment and the D2D data for two UEs, FIG. 7 illustrates the D2D communication timing for the UE-autonomous scheduling Mode 2.

DETAILED DESCRIPTION

Figure 1:
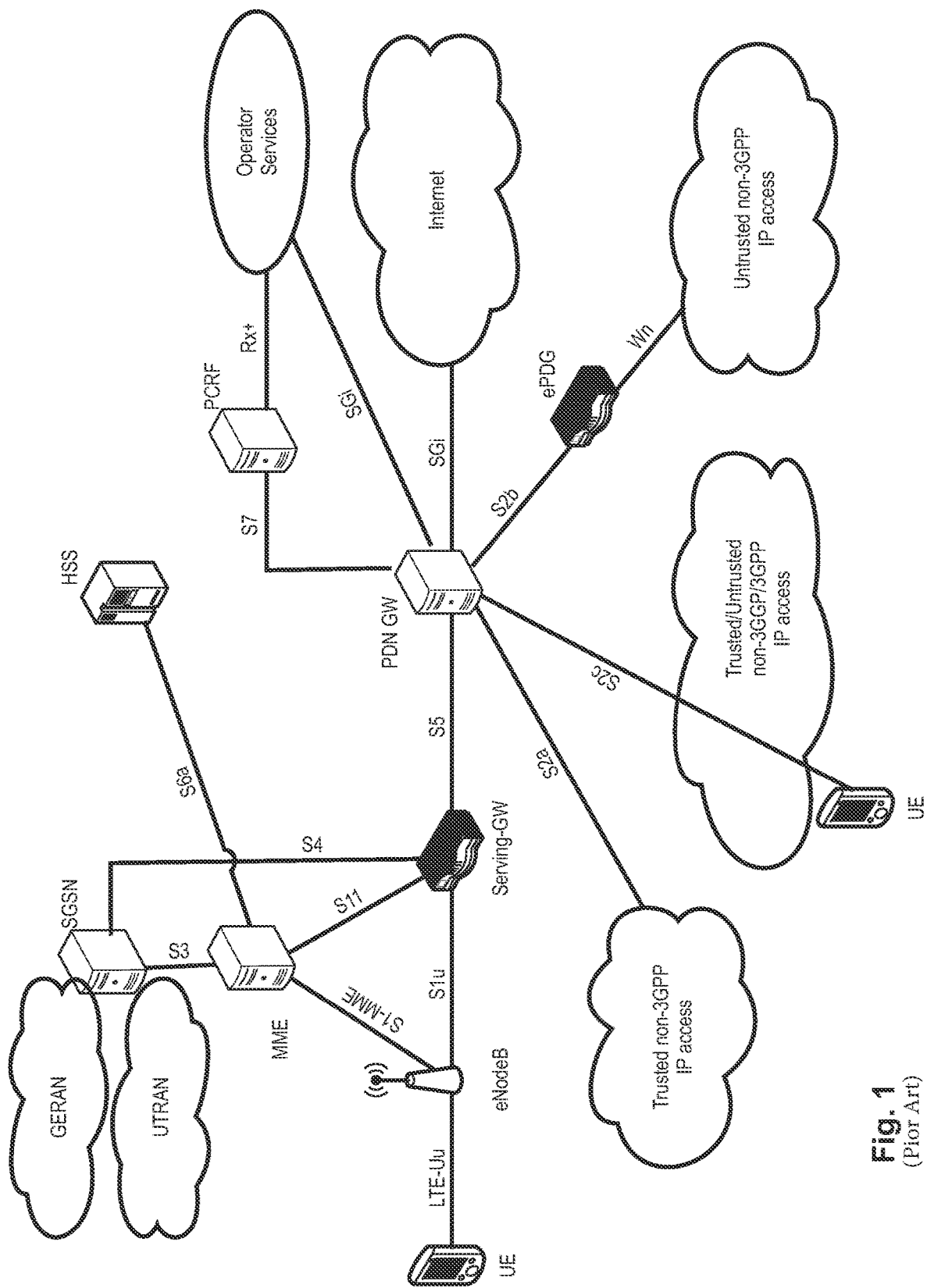
FIG. 1 shows an exemplary architecture of a 3GPP LTE system.
Figure 2:
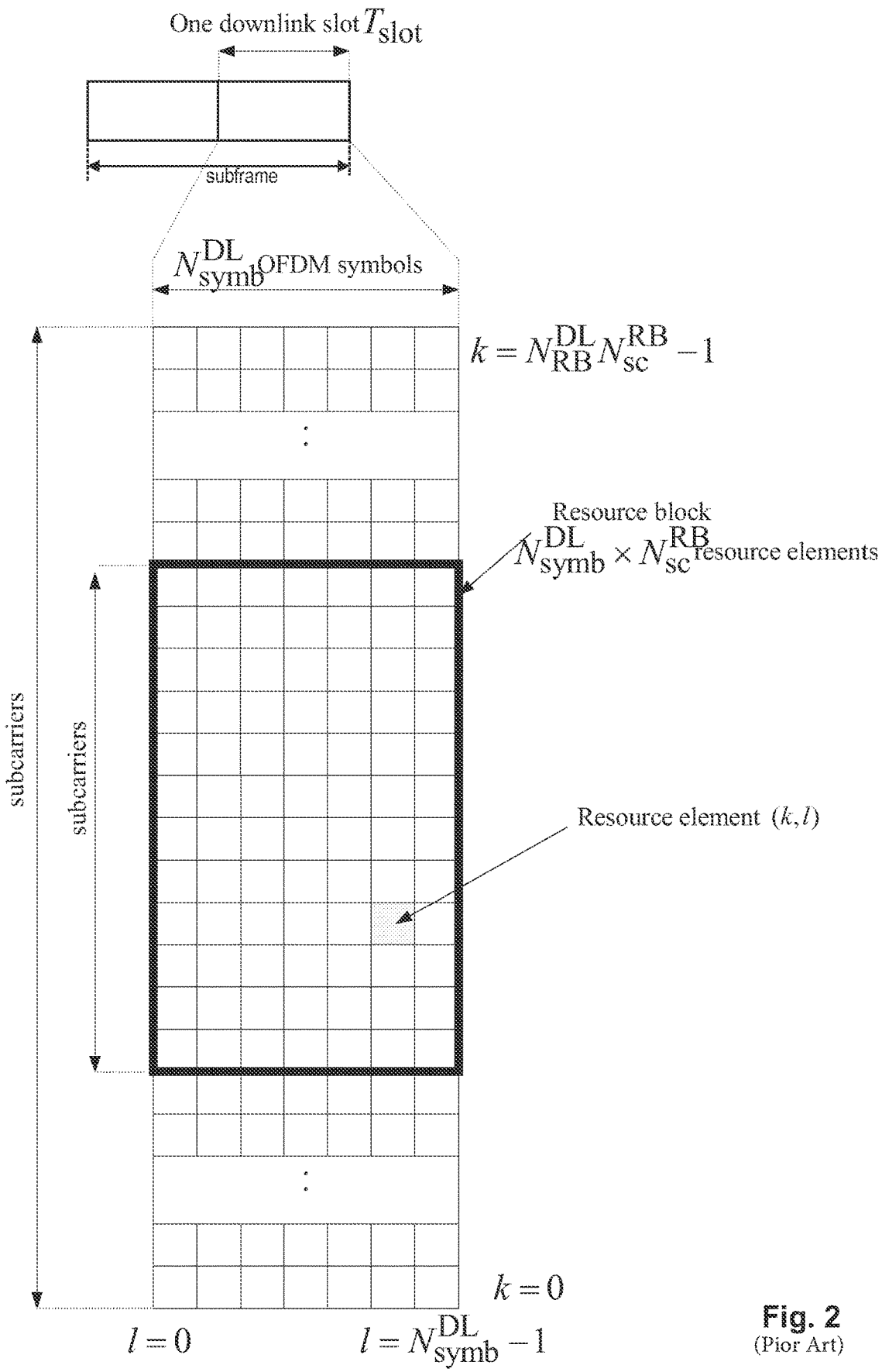
FIG. 2 shows an exemplary downlink resource grid of a downlink slot of a subframe as defined for 3GPP LTE (Release 8/9), FIG. 3 schematically illustrates a PC 5 interface for device-to-device direct discovery, FIG. 4 schematically illustrates a radio protocol stack for ProSe direct discovery.
Figure 3:
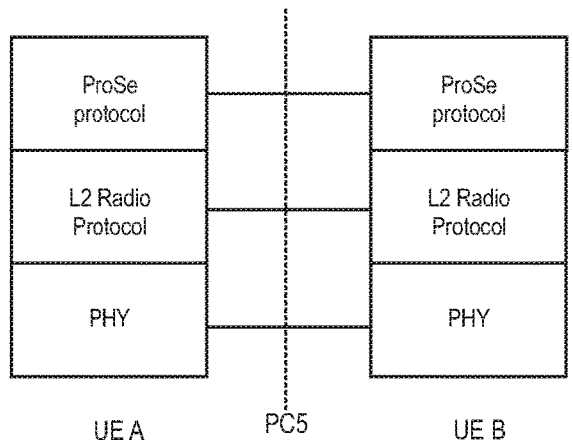
Figure 4:
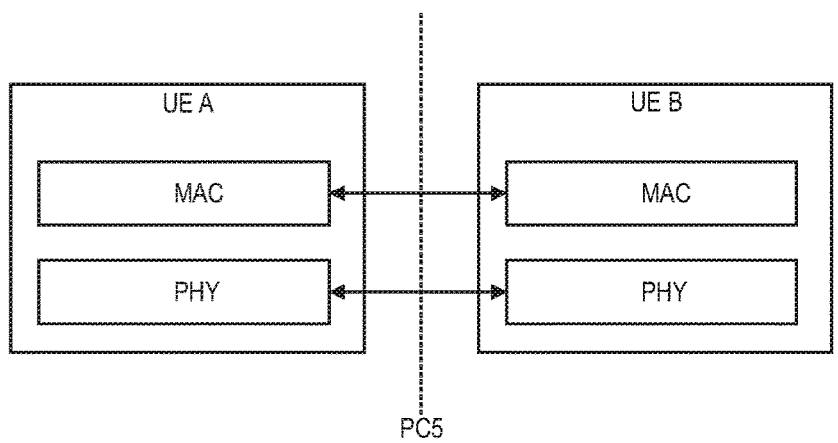
Figure 5:
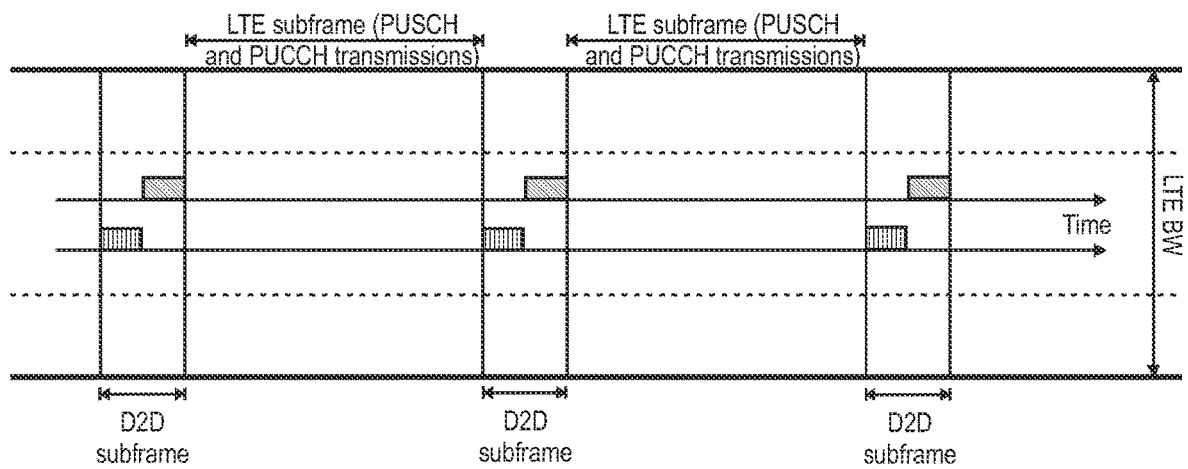
FIG. 5 illustrates the use of transmission/reception resources for overlay (LTE) and underlay (D2D) systems.
Figure 8:
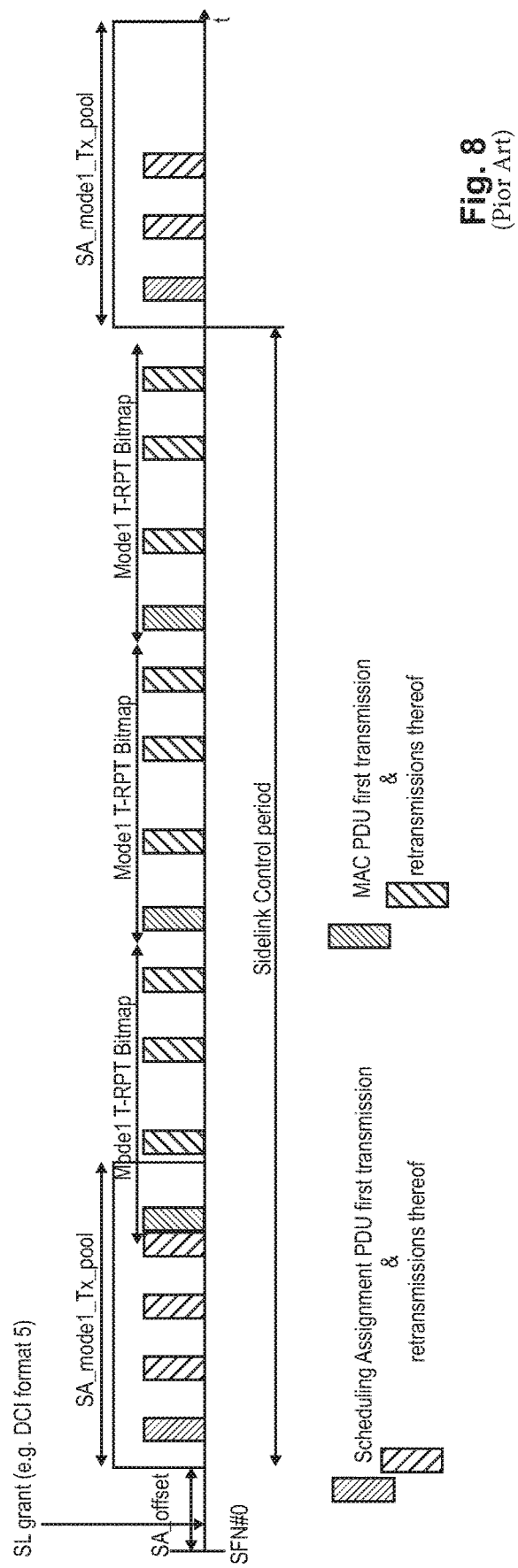
FIG. 8 illustrates the D2D communication timing for the eNB-scheduled scheduling Mode 1.
Figure 9:
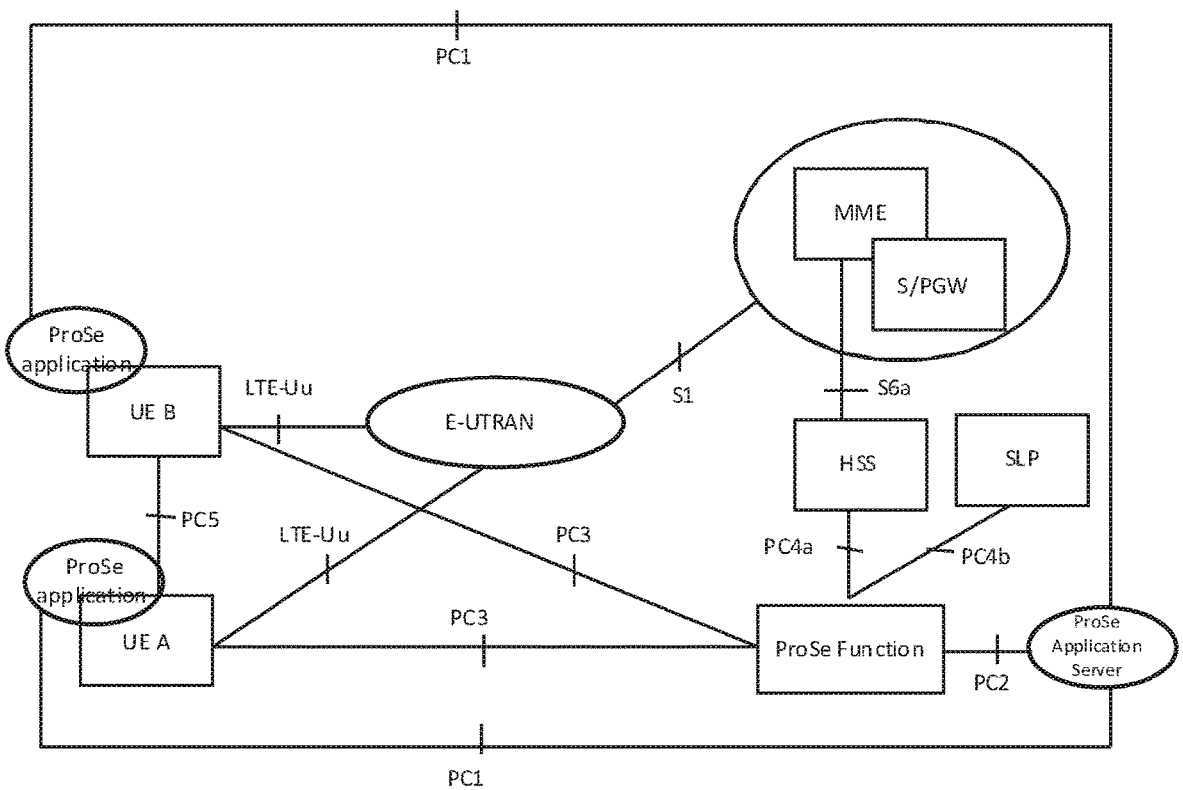
FIG. 9 illustrates an exemplary architecture model for ProSe for a non-roaming scenario.
Figure 10:
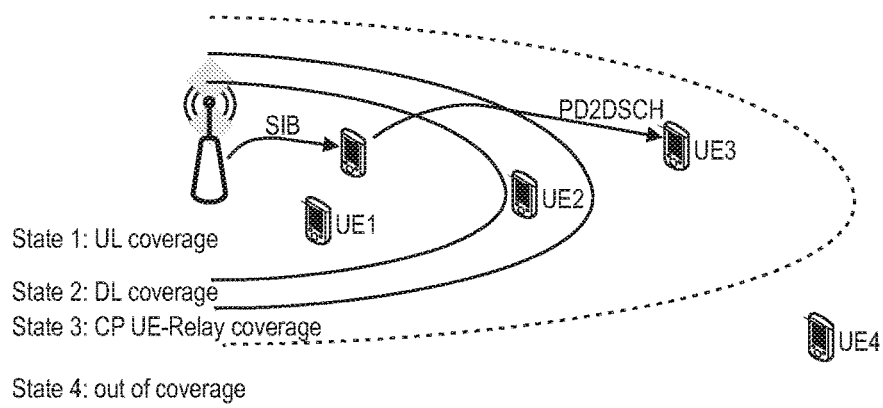
FIG. 10 illustrates cell coverage regarding four different states the D2D UE can be associated to, FIG. 11 illustrates the ProSe Buffer Status Reporting MAC Control Element defined in the standard.
Figures 11, 12:
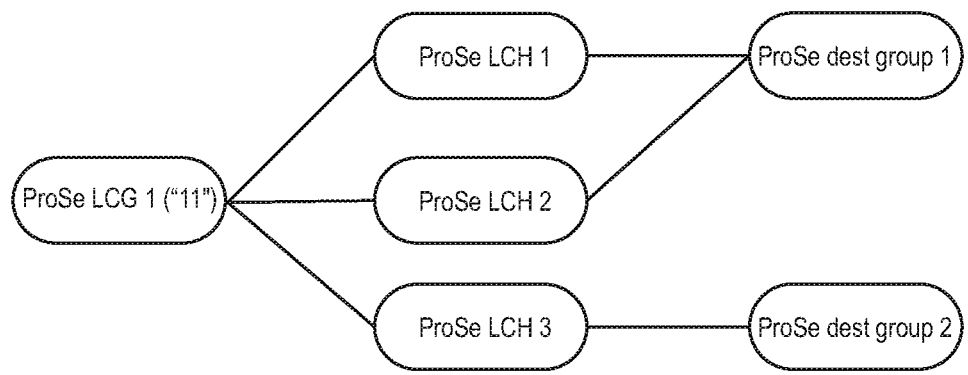
FIG. 12 illustrates an association between ProSe logical channels, ProSe LCGs, and ProSe destination groups for an exemplary scenario.

A user equipment (UE), a mobile station, a mobile node, or a user terminal is a physical entity within a communication system. A user equipment may have several functional components including an interface that enables it to communicate via a medium within the communication system, for instance, with other user equipments. Similarly, an evolved Node B (eNB), a base station, a network node, or a network terminal has several functional components, including a interface that enables it to communicate via same medium within the communication system, for instance, with user equipments.

The term "radio resources" is used in the context of the specification as broadly referring to physical radio resources, such as time-frequency resources (e.g., resource elements REs or resource blocks, RBs) for use as a communication medium by the user equipment and/or by the evolved Node B as described above.

The term "(direct) sidelink, SL, transmission" is used in the context of the specification as broadly referring to a direct transmission between two user equipments, i.e., not via the evolved Node B (eNB). A sidelink communication is established in-between the two user equipments exchanging sidelink transmissions. The term "(direct) sidelink communication" is used henceforth synonymously with Device-to-Device, D2D, communication or ProSe communication.

Further, a direct sidelink transmission is performed over a "sidelink, SL, interface", which is a term used in the context of the specification as broadly referring to the functionality of the user equipment providing for sidelink transmissions. In 3GPP LTE terminology, the sidelink interface is a PC5 interface as described in the background section.

The term "sidelink, SL, process" is used in the context of the specification as broadly referring to a process configured within a user equipment which may be associated with a sidelink grant. Such sidelink process is said to be configured for the corresponding user equipment providing the capabilities to associate an SL grant with it on a per SC period basis. In 3GPP LTE terminology, a sidelink process is maintained by a sidelink HARQ Entity at the MAC entity for transmission on the sidelink-shared cannel, SL-SCH, as described in the background section.

However, in the context of the specification, the sidelink process shall not be restricted in this respect. Rather, a sidelink process may only involve a memory region within the user equipment where the associated sidelink grant or sidelink grant information is stored and maintained. Such a memory region is managed by the user equipment, e.g., associating (or storing) the memory region with newly received sidelink grant information or (re-)initializing (or erasing) the memory region in order to remove a previously associated sidelink grant information.

The term "sidelink control, SC, period" is used in the context of the specification as broadly referring to the period of time where a user equipment performs the sidelink transmission. Each sidelink transmission comprises at least one scheduling assignment (sidelink control information) transmission and at least one corresponding data transmission. Put differently, a "sidelink control period" can also be seen as that period of time for which a sidelink grant is valid. In 3GPP LTE terminology, the "sidelink control period" is a SA/data period, or a SC (sidelink control) period.

The term "ProSe destination group" or "sidelink destination group" is used throughout the specification as referring to e.g., one Source Layer-2 ID— Destination Layer 2 ID pair defined in 3GPP LTE terminology.

The expressions "acquiring a (sidelink) grant", "receiving a (sidelink) grant" and similar expressions, refer broadly to a user equipment which acquires/receives a (sidelink) grant from a responsible evolved node B (i.e., Mode1 functionality). Conversely, the expression "autonomously select a (sidelink) grant", and similar expressions refers broadly to a UE which identifies the (sidelink) grant by itself, namely by autonomously selecting resources for a grant from suitable transmission resource pool(s) (i.e. Mode2 functionality) (i.e., the UE internally receives the grant).

The currently-standardized transmission scheme to be used for D2D communication, both relating to Mode1 (i.e., eNB-scheduled) and Mode2 (autonomous-scheduling), has been explained in the background section.

At the moment a UE can have only one (valid) sidelink grant (SL grant) per sidelink control period (SC period). Accordingly, a UE is presently also configured with only one SL process which is associated with same grant. Even if the eNB issues several grants to the UE in Mode1, the UE only considers the most recently (i.e., last) received one as the valid SL grant for the SC period. Particularly, the SL process overwrites previously-received SL grant(s), hence, the SL process is associated only with the most recently received SL grant.

Correspondingly, since there is only one SL grant available per SC period, the UE can only transmit one scheduling assignment, SA, or sidelink control information, SCI, per SC period. In turn, the transmitting UE can transmit data only to one or more receiving UEs of one ProSe destination group per scheduling assignment, SA, or scheduling control information, SCI, respectively.

More particularly, for MAC packet data unit(s), PDU(s), associated with one SCI, the transmitting UE shall only consider logical channels with same Source Layer-2 ID-Destination Layer-2 ID pairs. This currently-standardized D2D transmission scheme causes several disadvantages.

In case the UE has data for more than one ProSe destination group in its buffer(s), the transmitting UE is restricted to transmit data to only one ProSe destination group per SC period. Accordingly, the data of the remaining ProSe destination group(s) is delayed by at least one additional SC period. In other words, since the scheduling assignment, SA, or sidelink control information, SCI, transmission may only indicate one ProSe destination group, the corresponding data transmission is restricted to same ProSe destination group only.

Depending on the configured SC periodicity and the number of SC periods required to transmit the complete data to one ProSe destination group, the delay may be significant, resulting in disadvantageous sidelink communication properties. This is even the case, where the radio resources allow for transmitting data of more than the first-served ProSe destination group.

Further, the transmitting UE may only inefficiently make use of the D2D transmission resources it is assigned with for data transmissions by an evolved Node B, eNB. The evolved Node B, eNB, may assign more D2D transmission resources (by means of the SL-grant) than the transmitting UE needs. However, due to the restriction to only one ProSe destination group, the transmitting UE cannot utilize all of the assigned radio resources, for instance, if the UE has not enough data in its buffer for the one ProSe destination group. For instance, this may happen when the buffer status information signaled by the transmitting UE to the eNB is not accurate, or outdated. In said case, some of the allocated radio resources remain unused since they cannot be used for the transmission of data of another ProSe destination group within the same SC period.

The following exemplary embodiments are conceived by the inventors to mitigate the problems explained above.

Some of these exemplary embodiments are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the Technical Background section above, but the embodiments are not limited to their use in this particular exemplary communication networks only.

The following explanations shall not be understood as limiting the scope of the disclosure, but as a mere example of embodiments to better understand the present disclosure. A skilled person shall be aware that the general principles of the present disclosure, as laid out in the claims, can be applied to different scenarios and in ways that are not explicitly described herein. Correspondingly, the following scenarios are assumed for explanatory purposes of the various embodiments and shall not be limiting on its embodiments as such.

First Embodiment

In the following a first embodiment for solving the above problem will be described in detail. Implementations of the first embodiment will be explained in connection with FIG. 13. For illustration purposes, several assumptions are made which however shall not restrict the scope of the embodiment.

Firstly, user equipments are assumed which are enabled to perform ProSe communication (ProSe-enabled UEs), i.e., D2D transmissions directly between UEs without the detour via the eNodeB. Furthermore, the UEs shall have data destined to a plurality of sidelink destination groups (i.e., ProSe destination groups) available for transmission, although the improved direct sidelink transmission mechanism according to this first embodiment is also applicable where only data for a single sidelink destination group is available for transmission in the UE.

The first embodiment improves direct sidelink transmissions by introducing the concept of (a plurality of) sidelink processes in a UE to which sidelink grant(s) can be assigned in a one-to-one manner. Put differently, a UE can handle a plurality of sidelink grants by operating a corresponding sidelink process for each sidelink grant. A sidelink process can be addressed by use of a corresponding identification, exemplarily termed in the following sidelink process ID.

Whereas the currently-standardized mobile communication system only allows for a single valid sidelink grant to be utilized by a UE per sidelink control, SC, period (any previously received sidelink grant(s) are overwrites but the most recent one), the first embodiment shall improve D2D communication by allowing a UE to have more than one valid sidelink grant per same one SC period.

In other words, a transmitting UE, according to the first embodiment, is allowed to have one valid sidelink grant per sidelink process such that a transmitting UE configured with a number of sidelink processes may have same number of valid sidelink grants for an SC period. Hence, for an UE the maximum number of sidelink processes is restricting its sidelink communication capabilities.

Secondly, the user equipment of this embodiment is assumed to be configured with a maximum number of sidelink processes. This maximum number of SL processes may be specific to the implementation, hence, pre-configured within a user equipment. The maximum number may also be UE-specific, such that the UE is configured by the evolved Node B where it is in coverage. Or the number may even be network-specific, such that every UE within a same network is configured with a same maximum number of sidelink processes. Mechanisms for either the UE-specific configuration or the network-specific configuration may involve RRC signaling.

Notably, even though sidelink transmissions are direct transmissions from one (transmitting) UE to one or more (receiving) UE(s), there is no necessity that all UEs involved in such sidelink transmissions are configured with a same maximum number of sidelink processes.

Rather, a transmitting UE may be configured with a maximum number of SL processes that is higher than that of the one or more receiving UE(s) it is directing sidelink transmissions to. Moreover, it must only be ensured that all of the SL transmissions from the transmitting UE can be received by the one or more receiving UE(s) within the sidelink destination group. Not only the transmitting, but also the receiving UE(s) are configured with a sufficient number of sidelink processes in this respect.

Nevertheless, for a simplified configuration of the transmitting and receiving UEs it is assumed that the maximum number of sidelink processes is network-specific. For instance, the maximum number of sidelink processes may be m={2, 4, 8}, where the following examples refer to the case that each UE is configured with m=2 (two) sidelink processes within the communication system. Accordingly, such exemplary UEs are able to handle two different sidelink grants at the same time (a UE thus has two valid sometimes also referred to as configured sidelink grants available within an SC period).

Overall, the UE performs a D2D transmission operation for each sidelink process with a corresponding sidelink grant within the same SC period, e.g., respectively according to already-standardized concepts for performing D2D transmissions as explained in the background section. In particular, for each sidelink grant available to the UE (i.e., for each sidelink process), the UE determines one sidelink destination group and generates the corresponding transport blocks containing the data destined to the determined sidelink destination group. Radio resources are allocated for the D2D transmissions according to the respective sidelink grant. For each sidelink grant available to the UE (i.e., for each sidelink process), the UE generates corresponding sidelink control information identifying the sidelink destination group and also the allocated radio resources for the corresponding D2D transmission, and performs the D2D transmission of the sidelink control information and the corresponding data for each sidelink grant (process) using the allocated radio resources of the respective sidelink grant.

Details on these steps for performing a D2D transmission are omitted here, and instead reference is made to the corresponding passages in the background section of this application.

The above described principles underlying the first embodiment entail various advantages. Already established procedures can be reused in said respect without modification. For instance, the same SCI format 0 can be used to transmit the sidelink control information since no additional information needs to be carried. Furthermore, since the D2D transmission for each sidelink process remains unchanged when compared to the currently standardized D2D transmissions, a receiving UE does not (and actually does not need to) distinguish between a D2D transmission performed according to the first embodiment for one sidelink process and a D2D transmission performed according to the current standard. Consequently, the UE behavior on the receiving side does not need to be adapted.

Furthermore, the first embodiment allows transmitting more data within a SC period, thus increasing the data rate for D2D transmissions.

In addition, the first embodiment allows transmitting data destined to several sidelink destination groups within the same SC period, by e.g., selecting a different sidelink destination group for each of the various sidelink processes. Therefore, starvation of particular sidelink destination groups can be avoided.

So far it was generally assumed that the UE has several sidelink grants available, without paying attention to how the UE has acquired them in the first place. This shall be described in more detail in the following.

First Variation

In the first variation, the transmitting UE acquires in this first embodiment a plurality of sidelink grants for at least some out of the maximum number of sidelink process with which the UE is configured. The plurality of sidelink grants are signaled by an evolved node B and the UE receives them applying the standardized signaling scheme (e.g., via PDCCH).

From among these acquired plurality of sidelink grants, the transmitting UE selects a number of sidelink grants. For instance, the number of sidelink grants to be selected by an UE may be n={2, 4, 8}, the illustrated example shows the case where the UE is configured to select n=2 sidelink grants. In other words, the transmitting UE does not store or maintain all of the sidelink grants signaled by the evolved node B and subsequently acquired by the UE but only a number of sidelink grants.

Particularly, the transmitting UE selects from among the acquired plurality of sidelink grants the number of sidelink grants which has been most recently acquired before the start of the sidelink control period. Assuming the start of the sidelink control period at a specific sub-frame, the transmitting UE selects those sidelink grants which were acquired last before that specific sub-frame.

This however does not mean that the transmitting UE can only perform the selection of the number of sidelink grants at the start of the sidelink control period. Rather, the UE may achieve this selection of sidelink grants by (re-)associating each of the plurality of sidelink process (e.g., by overwriting of the involved memory region)—in an alternating fashion—with the more recently acquired sidelink grants.

Accordingly, the UE may assign, each time a new, more recent sidelink grant is acquired, that newly acquired sidelink grant to that of the plurality of sidelink processes with the oldest sidelink grant, thereby the UE has also selected at the start of the sidelink control period the number of most recent sidelink grants. In this respect, the UE may alternate the plurality of sidelink processes when assigning the most recently acquired sidelink grant thereto.

Figure 13:
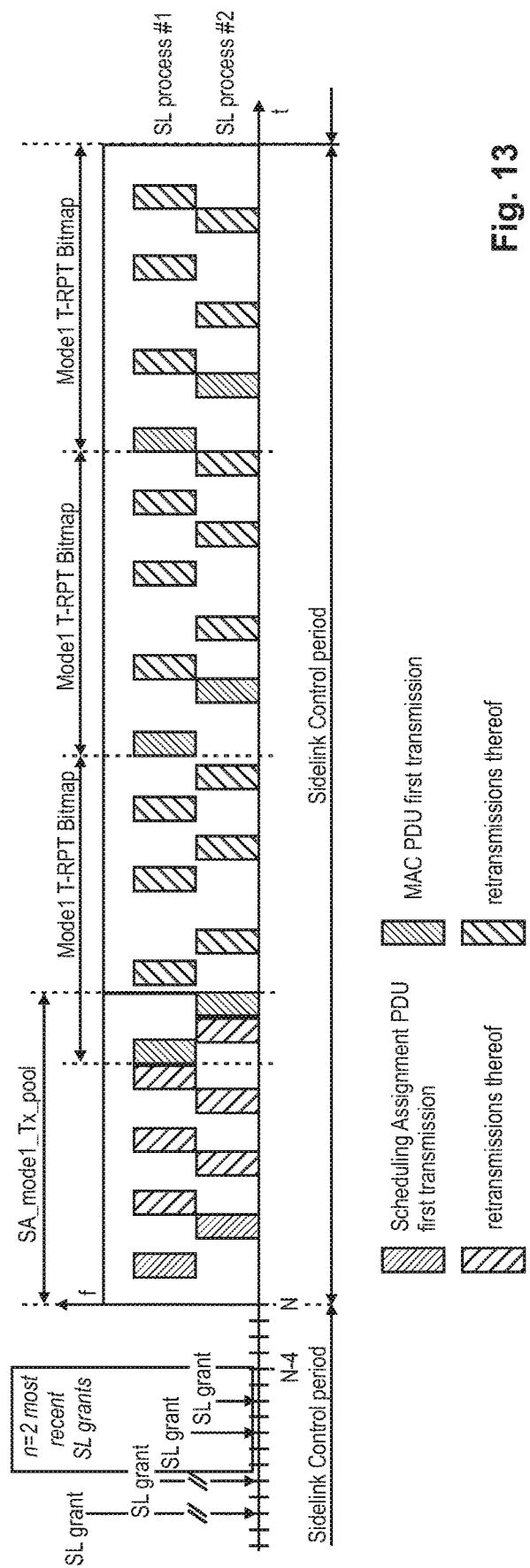
FIG. 13 illustrates a D2D communication timing for two eNB-scheduled D2D transmissions according to a first variation of the first embodiment.

Reference is now made to the example illustrated in FIG. 13. In this example it is assumed that the UE is configured with n=2 (two) number of sidelink grants to be selected, and m=2 (two) maximum number of sidelink process, The UE acquires sidelink grants until the start at sub-frame N of the sidelink control period (precisely: until 4 sub-frames before the start of the sidelink control period at sub-frame N-4).

A first acquired sidelink grant, e.g., at sub-frame N-13, is associated with a first of m=2 (two) configured sidelink processes, and a subsequently acquired sidelink grant, e.g., at sub-frame N-11, is associated with the second of the two configured sidelink processes. In other words, the sidelink grants are cyclically associated with the configured sidelink processes.

When a further sidelink grant is acquired, e.g., at sub-frame N-8, the UE knows that it is configured to only select n=2 (two) number of sidelink grants, hence proceeds with (or cycles to) (re-)associating the newly acquired sidelink grant with the first of the m=2 (two) configured sidelink processes. In other words, the sidelink grant acquired at sub-frame N-13 and previously (also) associated with the first of the two configured sidelink processes is overwritten.

Notably, this cyclic association with configured sidelink processes depends on the number (m=2) of sidelink grants to be selected and not on the maximum number (n=2) of sidelink process with which the UE is configured. Moreover, the number (n=2) of selected sidelink grants may not exceed (n<=m) the maximum number (m=2) of configured sidelink processes.

Finally, when an even further sidelink grant is acquired by the UE, e.g., at sub-frame N-6, this sidelink grant again is associated with the second of the m=2 (two) configured sidelink processes. Accordingly, the sidelink grant acquired at sub-frame N-11 and previously (also) associated with the second of the two configured sidelink processes is overwritten.

In summary, by applying the above described behavior, the transmitting UE has acquired a plurality of sidelink grants, and at the start (more precisely at 4 sub-frames before the start) of the sidelink control period selected a number of those sidelink grants which have most recently been acquired before that start of the sidelink control period. Further, each of the n=2 (two) number of selected sidelink grants is associated with a different one of the m=2 (two) configured sidelink processes.

In an advantageous implementation, prior to associating the new, most recently acquired sidelink grant to the corresponding one of the configured sidelink processes, the transmitting UE determines whether or not this newly acquired sidelink grant corresponds to another of the sidelink grants already associated with a different one of the plurality of configured sidelink processes. Should this be the case, and should two acquired sidelink grants indicate same radio resources (i.e., resulting in radio resource collisions) for the plurality of sidelink transmission, same newly received sidelink grant is discarded (i.e., without associating the newly acquired sidelink grant to the corresponding sidelink process). Thereby, the cyclic association with the configured sidelink processes is maintained.

Even though the above described mechanisms are simple, they can advantageously make use of this behavior to suppress interference or distortions on the medium used by the evolved Node B for signaling the sidelink grants to the transmitting UE (i.e., PDCCH).

Conventionally, an evolved Node B copes with interference or distortion (e.g., on the PDCCH) by signaling a same sidelink grant to a transmitting UE for a plurality of times. The UE acquires only those sidelink grants which are not affected by interference or distortion. Hence, the probability of a successfully acquired sidelink grant at the transmitting UE improves every time the same sidelink grant is repeatedly signaled by the evolved Node B. The conventional transmitting UE overwrite the SL grant every time it is successfully acquired. This approach is simple and robust as long as a same sidelink grant is involved.

Applying this approach to a plurality of different sidelink grants indicating radio resources for different sidelink transmissions between the transmitting UE and one or more receiving UE(s) is not evident. Moreover, the evolved Node B does not know which of a plurality of different sidelink grants is being acquired successfully by the transmitting UE and which is not. In other words, the evolved Node B cannot assess whether or not retransmissions of one or another of the plurality of different sidelink grants are necessary before the start of the SC period.

Regardless, the transmitting UE in the first variation assumes a repeated signaling of different sidelink grants and, upon successfully acquiring a plurality of sidelink grants, selects among the acquired sidelink grants a number of those sidelink grants which have most recently been acquired before the start of the sidelink period. Moreover, the sidelink grants are acquired by the UE prior to, hence, for the subsequent SC period.

This approach is advantageous for the following reasons: In case the UE successfully acquires all sidelink grants signaled by the evolved Node B, the selection of a number of the most recently acquired sidelink grants results in the transmitting UE being provided with different sidelink grants; hence, the transmitting UE is capable of performing a plurality of (different) sidelink transmissions to one or more receiving UEs.

Also in case the UE successfully acquires only the last number of sidelink grants signaled by the evolved Node B, the selection of the most recently acquired grants also results in the transmitting UE being provided with different grants. Accordingly, all sidelink grants but the last number of signaled sidelink grants may be not successfully acquired as long as the last number of signaled sidelink grants is successfully acquired by the transmitting Should, however, e.g., the last of the by the evolved Node B signaled sidelink grants not be successfully acquired by the UE (better: not acquired at all) the UE selects a number of successfully acquired sidelink grants excluding the not successfully signaled last sidelink grant. Also this case results in the transmitting UE acquiring a number of different sidelink grants as shall become apparent from the following consideration:

Assuming a repeated signaling of different sidelink grants, even in this case, the transmitting UE successfully acquires different sidelink grants as the repeated signaling by the evolved Node B ensures that also this selected number of sidelink grants is different, hence can be used by the transmitting UE for performing a plurality of (different) sidelink transmissions to one or more receiving UEs.

Further, even if one of the intermediately by the evolved Node B signaled sidelink grants not be successfully acquired by the UE (i.e., not acquired), then the selection of the number of most recently received sidelink grants can also result in the acquiring of different sidelink grants provided the evolved node B signals an exceeding number of different sidelink grants (or "spare" sidelink grants) within the most recently acquired sidelink grants successfully acquired by the transmitting UE. In other words, by increasing the periodicity at which different sidelink grants are repeatedly signaled by the evolved Node B with respect to the number of sidelink grants that are acquired by the transmitting UE can ensure that at least the most recently acquired sidelink grants are successfully acquired by the UE.

In summary, the selection of a number of the most recently acquired sidelink grants by a transmitting UE provides for a mechanism that allows the UE for performing a plurality of (different) sidelink transmissions to one or more receiving UEs without losing the advantage of a better interference or distortion rejection as part of the conventional approach.

Further, this approach is advantageous in that it does not require any identification information to be included within the sidelink grants for associating the acquired sidelink grants to one of the maximum number of sidelink process with which the transmitting UE is configured. Consequently, the information and, hence, the size of each of the sidelink grants signaled can be kept at a minimum by the UE separately associating the acquired sidelink grants with the corresponding from among the maximum number of sidelink processes The number of sidelink grants selected by the UE may not exceed the maximum number of sidelink process with which the UE is configured for that sidelink control period. Thereby, it can be ensured that the all by the UE selected sidelink grants may be associated with a different one of the selected number of sidelink grants for allocating radio resources within the sidelink control period. For each of the sidelink process being associated with different one of the selected sidelink grant, the UE is allocating radio resources within the sidelink control period for which it is received according to the associated sidelink grant for performing a respective one of the plurality of sidelink transmissions to one of the one or more of the receiving UEs.

According to an exemplary implementation, the number of sidelink grants selected by the UE corresponds to the maximum number of sidelink process within which the UE is configured for the sidelink period. Thereby, all of the configured maximum number of sidelink processes can be associated with a different one of the selected number of sidelink grants for allocating radio resources within the sidelink control period.

An exemplary implementation applying the above described principles of the first variation may involve the following changes to the relevant 3GPP technical standard in TS 36.321 from in its current version V12.7.0. Only the relevant sub-sections are provided below for conciseness reasons, nevertheless, all other sections of this document TS 36.321 are also incorporated herein by reference only.

5.14 SL-SCH Data Transfer
5.14.1 SL-SCH Data Transmission
5.14.1.1 SL Grant Reception and SCI Transmission In order to transmit on the SL-SCH the MAC entity must have a sidelink grant. The MAC entity can have up to x sidelink grants. The sidelink grant is selected as follows:
  if the MAC entity is configured to receive a sidelink grant dynamically on the PDCCH or EPDCCH and more data is available in STCH than can be transmitted in the current SC period, the MAC entity shall:
    using the received sidelink grant determine the set of subframes in which transmission of SCI and transmission of first transport block occur according to subclause 14.2.1 of [2];
    consider the last x received sidelink grants received until and including 4 subframes before the starting subframe of the first available SC Period to be configured sidelink grants, overwriting previously configured sidelink grants occurring in the same SC period, if available;
    clear the configured sidelink grant at the end of the corresponding SC Period;
  else, if the MAC entity is configured by upper layers to transmit using a pool of resources as indicated in subclause 5.10.4 of [8] and more data is available in STCH than can be transmitted in the current SC period and if the MAC entity does not have a configured sidelink grant, the MAC entity shall:
    randomly select a sidelink grant from the resource pool configured by upper layers. The random function shall be such that each of the allowed selections [2] can be chosen with equal probability;
    using the selected sidelink grant determine the set of subframes in which transmission of SCI and transmission of first transport block occur according to subclause 14.2.1 of [2];
    consider the selected sidelink grant to be a configured sidelink grant occurring in those subframes starting at the beginning of the first available SC Period which starts at least 4 subframes after the subframe in which the sidelink grant was selected;
    clear the configured sidelink grant at the end of the corresponding SC Period;
  NOTE: Retransmissions on SL-SCH cannot occur after the configured sidelink grant has been cleared.

The MAC entity shall for each subframe:
  if the MAC entity has a configured sidelink grant occurring in this subframe:
    if the configured sidelink grant corresponds to transmission of SCI:
    instruct the physical layer to transmit SCI corresponding to the configured sidelink grant.
      else if the configured sidelink grant corresponds to transmission of first transport block:
    deliver the configured sidelink grant and the associated HARQ information to the Sidelink HARQ Entity for this subframe.

5.14.1.2 Sidelink HARQ operation
5.14.1.2.1 Sidelink HARQ Entity

There is one Sidelink HARQ Entity at the MAC entity for transmission on SL-SCH, which maintains X Sidelink process.

For each subframe of the SL-SCH the Sidelink HARQ Entity shall:
  if a sidelink grant has been indicated for a Sidelink process and there is SL data available for transmission:
    obtain the MAC PDU from the "Multiplexing and assembly" entity;
    deliver the MAC PDU and the sidelink grant and the HARQ information to the Sidelink process;
    instruct the Sidelink process to trigger a new transmission.
  else, if this subframe corresponds to retransmission opportunity for the Sidelink process:
    instruct the Sidelink process to trigger a retransmission.
  NOTE: The resources for retransmission opportunities are specified in subclause 14.2.1 of [2].

According to an alternative implementation, a sidelink grant reception window associated with an SC period is introduced, which denotes the time period where received sidelink grants are considered for the corresponding SC period. The sidelink grant reception window associated with SC period n, starts from the sub-frame y−3, whereas sub-frame y denotes the starting sub-frame of SC period n−1 (previous SC period), and ends 4 sub-frames before the starting sub-frame of SC period n. For the first variation the UE considers the last x received sidelink grants (if available) received within the sidelink grant reception window as configured sidelink grants for corresponding SC period.

Second Variation

In the second variation, the transmitting UE acquires in this first embodiment a plurality of sidelink grants for at least some out of the maximum number of sidelink process with which the UE is configured. The plurality of sidelink grants are signaled by an evolved node B and the UE receives them applying the standardized signaling scheme (e.g., via PDCCH).

It is important to recognize for this second variation, that the signaling grants are acquired in different sub-frames before the start (precisely: until 4 sub-frames before the start) of the sidelink control period. In other words, depending on the sub-frame when a sidelink grant is acquired, the transmitting UE assumes a (potentially) different behavior in assigning the sidelink grant to one of the configured maximum number of sidelink processes (cf. above e.g., m={2, 4, 8}).

Notably, this second variation does not allow, as the previous variation, for the UE to select (and hence associate) a number n of sidelink grants corresponding to a subset of the maximum number of the m configured maximum number of sidelink processes. Moreover, the UE is adapted to associate, from among the plurality, the maximum number m of acquired sidelink grants with the corresponding maximum number m of configure sidelink process within the transmitting UE. Obviously, for this behavior it is necessary that the UE actually acquires a maximum number m of sidelink grants.

As stated above, the sub-frame, when the sidelink is acquired, determines within the transmitting UE the sidelink process with which it is associated. More in particular, since a plurality sidelink grants are signaled, and hence acquired in different sub-frames before the start (precisely: until 4 sub-frames before the start) of the sidelink control period, the sub-frame allows for an unambiguous assignment for associating each of the acquired sidelink grants with one of the configured maximum number of sidelink grants.

The transmitting UE applies an association scheme for associating an acquired sidelink grant with one of the maximum number of configured sidelink processes. This association scheme is defined as follows: each of the maximum number of SL processes is associated with sidelink grants from a set of different sub-frames, and each of the sub-frames in the corresponding set is offset from one another by a pre-defined number (e.g., o) of sub-frames.

In other words, each set of different sub-frames in which sidelink grants are acquired defines for these sidelink grants an association thereof with one of the configured sidelink processes. The sets of sub-frames are distinct from each other as each of the sets involves different sub-frames. Further, the sub-frames of each set are offset with respect to each other. Thereby, subsequent sub-frames may associate therein acquired sidelink grants with different ones of the maximum number of configured sidelink processes. In other words, the sidelink grants associated with different sidelink processes are transmitted in an interleaved fashion, and have a synchronous timing.

In summary, by applying the association scheme for every sub-frame when the transmitting UE acquires a sidelink grant, the transmitting UE may (re-)associate one of the maximum number of sidelink processes with the most recently acquired sidelink grant (e.g., by overwriting the involved memory region). In this respect, each of the maximum number of configured sidelink process is associated with that sidelink grant which is acquired in the respective set of different sub-frames and which has most recently been acquired before the start of the subsequent sidelink control period.

Figure 14:
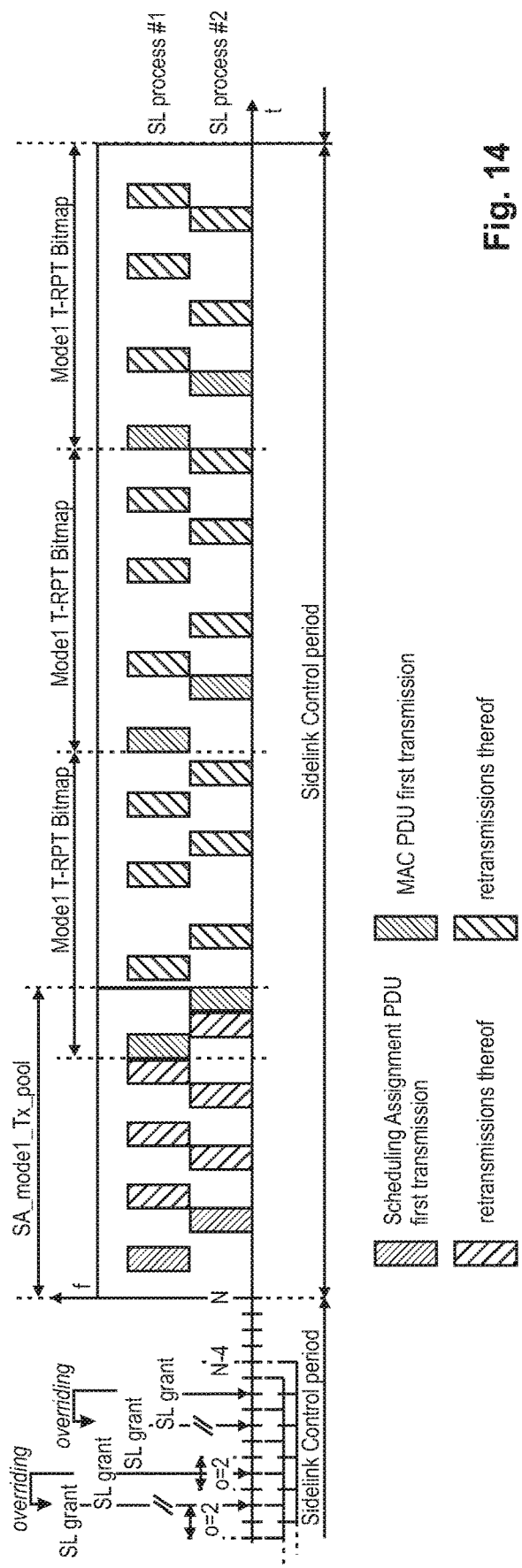
FIG. 14 illustrates the D2D communication timing for two eNB-scheduled D2D transmissions according to a second variation of the first embodiment.

Reference is now made to the example illustrated in FIG. 14. In this example, it is assumed that the UE is configured with m=2 (two) maximum number of sidelink processes, and an offset between the different sub-frames within a set corresponding to the predefined number of o=2 (two) sub-frames. This example shall not be construed as limiting the underlying concept since also offsets with e.g., o={2, 4, 8} are possible, as becomes apparent from the following. The UE acquires sidelink grants until the start at sub-frame N of the sidelink control period (precisely: until 4 sub-frames before the start of the sidelink control period N-4).

As apparent from the above, the offset e.g., o=2 between different sub-frames within a set may correspond to the maximum number e.g., m=2 of the configured sidelink processes or may be larger than this (thereby leaving intermediate sub-frames un-assigned to one or another of the maximum number of sidelink processes).

Moreover, a corresponding definition of the offset e.g., o=2 between different sub-frames within a set and the maximum number e.g., m=2 of configured sidelink processes makes most efficient use of the medium for signaling the sidelink grants (e.g., PDCCH), whereas a larger offset that the maximum allows reducing monitoring of same medium by the transmitting UE thereby improving the battery efficiency thereof.

Further to the illustrated example, an association scheme defines for the first of the maximum number of m=2 of sidelink processes, an association on the basis of a first set of different sub-frames, including sub-frames N-14, N-12, N-10, N-8, N-6, N-4. For the second of the maximum number of m=2 sidelink processes, the association scheme defines an association on the basis of a second set of different sub-frames, including sub-frames N-13, N-11, N-9, N-7, N-5. Regarding both sets, the different sub-frames are offset from each other by the predefined number of o=2 (two) sub-frames.

A first sidelink grant, acquired by the UE e.g., at sub-frame N-13, is associated with a second of m=2 (two) configured sidelink processes, since applying the above described association scheme, the UE determines that the sidelink grant is acquired in a sub-frame belonging to the second set of different sub-frames, and hence the UE assumes the association of this sidelink grant with the second of the maximum number of m=2 sidelink processes.

Subsequently, a further sidelink grant, acquired by the UE e.g., at sub-frame N-11, is also associated with the second of the two configured sidelink processes, as also this sidelink grant is acquired in a sub-frame belonging to the second set of sub-frames. Irrespective of any previous sidelink grant, the UE (re-)associates the newly acquired sidelink grant (e.g., at N-11) with the second of the m=2 (two) configured sidelink processes. In other words, the sidelink grant acquired at sub-frame N-13 and previously (also) associated with the second of the two configured sidelink processes is overwritten.

Thereafter, another sidelink grant, acquired by the UE, e.g., at sub-frame N-8, is associated with a first of m=2 (two) configured sidelink processes, since applying the above described association scheme, the UE determines that the sidelink grant is acquired in a sub-frame belonging to the first set of different sub-frames, and hence the UE assumes the association of this sidelink grant with the first of the maximum number of m=2 sidelink processes.

Finally, a further sidelink grant, acquired by the UE e.g., at sub-frame N-6, is also associated with the first of the two configured sidelink processes, as also this sidelink grant is acquired in a sub-frame belonging to the first set of sub-frames. The sidelink grant acquired at sub-frame N-8 and previously (also) associated with the first of the two configured sidelink processes is overwritten.

In summary, by applying the above described behavior the transmitting UE has acquired a plurality of sidelink grants, and at the start (more precisely at 4 sub-frames before the start) of the sidelink control period associated, each of the plurality of maximum number m=2 of sidelink processes is associated with that sidelink grant which is acquired in the respective set of different sub-frames and which has most recently been acquired before the start of the subsequent sidelink control period.

For each of the plurality of the SL processes, the transmitting UE allocates radio resources within a subsequent sidelink control period according to the sidelink grant, with which the respective sidelink process is associated, for performing one of the plurality of sidelink transmissions to one or more receiving user equipments.

According to exemplary implementation to the first or the second variation, the transmitting UE is acquiring sidelink grants for a (i.e., subsequent) sidelink control period until 4 sub-frames before the start of the sidelink control period. Thereby, the evolved node B is provided with precise information up when the most recent sidelink grants can be acquired by the UE. In other words, the evolved Node B can plan its appropriate signaling of sidelink grants in advance.

In a further exemplary implementation to the first or second variation, each of the plurality of sidelink processes is re-initialized (or flushed) before the start of the (i.e., subsequent) sidelink control period to thereafter allow its association to a later (i.e., sub-subsequent) sidelink control period. Assuming that sidelink grants can be acquired until 4 sub-frames before the start of the sidelink control period, the plurality of sidelink processes are re-initialized thereafter as early as possible, namely at 3 sub-frames before the start of the sidelink control period. Thereby, it can be ensured that acquired sidelink grants can already be associated with sidelink processes as soon as possible for the later (i.e., sub-subsequent) sidelink control period, which is particularly advantageous in the second variation however not limited thereto.

According to yet another exemplary implementation to the first and second variation, the transmitting UE is—after having associated each of the selected sidelink grants with different one of the sidelink processes—performing for each of the associated sidelink processes a logical channel prioritization, LCP, procedure. Having each of the LCP procedures identify different ProSe destination groups, it can be ensured that the plurality of sidelink transmissions are each performed to different one or more receiving UEs.

An exemplary implementation applying the above described principles of the second variation may involve the following changes to the relevant 3GPP technical standard in TS 36.321 from in its current version V12.7.0. Only the relevant sub-sections are provided below for conciseness reasons, nevertheless, all other sections of this document TS 36.321 are also incorporated herein by reference only.

5.14 SL-SCH Data Transfer
5.14.1 SL-SCH Data transmission
5.14.1.1 SL Grant Reception and SCI Transmission In order to transmit on the SL-SCH the MAC entity must have a sidelink grant. The MAC entity can have up to x sidelink grants. The sidelink grant is selected as follows:
if the MAC entity is configured to receive a sidelink grant dynamically on the PDCCH or EPDCCH and more data is available in STCH than can be transmitted in the current SC period, the MAC entity shall:
using the received sidelink grant determine the set of subframes in which transmission of SCI and transmission of first transport block occur according to subclause 14.2.1 of [2];
consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period received X subframes before the subframe in which the sidelink grant was received, if available;
clear the configured sidelink grant at the end of the corresponding SC Period;
else, if the MAC entity is configured by upper layers to transmit using a pool of resources as indicated in subclause 5.10.4 of [8] and more data is available in STCH than can be transmitted in the current SC period and if the MAC entity does not have a configured sidelink grant, the MAC entity shall:
randomly select a sidelink grant from the resource pool configured by upper layers. The random function shall be such that each of the allowed selections [2] can be chosen with equal probability;
using the selected sidelink grant determine the set of subframes in which transmission of SCI and transmission of first transport block occur according to subclause 14.2.1 of [2];
consider the selected sidelink grant to be a configured sidelink grant occurring in those subframes starting at the beginning of the first available SC Period which starts at least 4 subframes after the subframe in which the sidelink grant was selected;
clear the configured sidelink grant at the end of the corresponding SC Period;
NOTE: Retransmissions on SL-SCH cannot occur after the configured sidelink grant has been cleared.

The MAC entity shall for each subframe:
if the MAC entity has a configured sidelink grant occurring in this subframe:
if the configured sidelink grant corresponds to transmission of SCI:
instruct the physical layer to transmit SCI corresponding to the configured sidelink grant.
else if the configured sidelink grant corresponds to transmission of first transport block:
deliver the configured sidelink grant and the associated HARQ information to the Sidelink HARQ Entity for this subframe.

5.14.1.2 Sidelink HARQ Operation
5.14.1.2.1 Sidelink HARQ Entity

There is one Sidelink HARQ Entity at the MAC entity for transmission on SL-SCH, which maintains x Sidelink process.

For each subframe of the SL-SCH the Sidelink HARQ Entity shall:
if a sidelink grant has been indicated for a Sidelink process and there is SL data available for transmission:
obtain the MAC PDU from the "Multiplexing and assembly" entity;
deliver the MAC PDU and the sidelink grant and the HARQ information to the Sidelink process;
instruct the Sidelink process to trigger a new transmission.
else, if this subframe corresponds to retransmission opportunity for the Sidelink process:

instruct the Sidelink process to trigger a retransmission.

NOTE: The resources for retransmission opportunities are specified in subclause 14.2.1 of [2].

According to another implementation, at a given TTI, if a sidelink grant is received in this TTI, the UE identifies the sidelink process which the sidelink grant is associated with. A sidelink grant received in subframe n overrides a sidelink grant received in subframe n-X, whereas X denotes a predefined integer value.

Second Embodiment

In the following, a second embodiment for solving the above problems will be described in detail. Particularly, this embodiment focuses but is not limited to multiple sidelink transmission for the mode-2 resource allocation mode. Also in this respect, a mechanism is devised which allows allocating radio resources to perform a plurality of direct sidelink, SL, transmissions within a sidelink control, SC, period over a SL interface to one or more receiving user equipments in a communication system.

In more detail, the transmitting UE autonomously selects SL grants for the plurality of SL transmission from different resource pools, each being configured and made available for SL transmissions within the communication system. Further, the UE has to associate, for each of the plurality of SL transmissions, a SL grant to a different SL process selected from the different configured resource pools.

For each of the plurality of SL processes with an associated SL grant, the transmitting UE performs a separate logical channel prioritization, LCP, procedure which only considers logical channels to different destination Group IDs. Accordingly, the UE for each of the plurality of SL processes, allocates, within the same or overlapping SC periods, the radio resources according to the autonomously selected SL grant with which the respective SL process is associated.

Thereby, a transmitting UE may be configured to perform a plurality of SL transmissions within a same sidelink control period, each of the plurality of SL transmission being directed to one or more of the receiving UEs. Furthermore, the restriction to only allow SL transmission to different ProSe destination groups within a same SC period or overlapping SC periods (for the case that the transmitting UE performs SL transmissions in different transmission resource pools) advantageously dispenses with the need for any additional transport block, TB, reordering mechanism within the MAC layer. In other words, ProSe in-sequence delivery is enforced hereby.

According to an exemplary implementation, the transmitting UE further determine for each sub-frame within the SC period whether the allocated radio resources are arranged for plural SL transmission within a same sub-frame. Particularly, since the ProSe communication is carried out in the uplink band, applying a single carrier-frequency division multiple access, SC-FDMA scheme, the plurality of SL transmissions have to meet the single-carrier property becomes apparent from the following.

Apparent from the SC-FDMA scheme, the transmitting UE may only perform the transmission of a single transport block, TB, per transmission time interval, TTI. However, the autonomously selected radio resources for plural SL transmissions within a same SC period may not meet this property. In other words, the radio resources may not be allocated for same plural SL transmissions.

Should the transmitting UE determine that the allocated radio resources are not properly arranged, i.e., do not meet the single carrier property described above for each of the transmission time intervals, the UE may skip the respective SCI and/or data transmission for the SL process with a lower ranked logical channel priority of the SL transmission, or the UE may to skip the respective SCI and/or data transmission for the SL process with a lower ranked resource pool with which the SL process is associated.

The logical channel priority refers to the data transmission part of the SL transmission. Further, the resource pool ranking also establishes a priority for the data transmission part of the SL transmission. Further, skipping of separate transmissions is generally negligible to the system performance, as each of the resource pools provides for numerous retransmissions as described above.

In summary, this advantageous implementation enforces a compatibility of the plurality of SL transmissions with the SC-FDMA scheme by the transmitting UE when performing a plurality of SL transmissions within a same SC period, each of the SL transmissions being directed to one or more receiving UEs. Thereby, it can be avoided to define compatibilities between the autonomously selected SL grants from the different resource pools.

It should be noted that skipping some of the respective SCI and/or data transmission might be also necessary for the eNB controlled resource allocation mode (mode 1) in case the SL grants issued by the eNB may lead to that within the SC period the allocated radio resources are arranged for plural SL transmissions within a same sub-frame.

Hardware and Software Implementation of the Present Disclosure

Other exemplary embodiments relate to the implementation of the above described various embodiments using hardware, software, or software in cooperation with hardware. In this connection, a user terminal (mobile terminal) and an eNodeB (base station) are provided. The user terminal and base station are adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A base station, comprising:
   circuitry, which, in operation, generates a plurality of sidelink (SL) grants to allocate radio resources for a first user equipment to perform a plurality of direct SL transmissions over an SL interface to one or more second user equipments; and
   a transmitter, which, in operation, transmits, to the first user equipment, the plurality of SL grants for a subsequent sidelink control (SC) period, before a start of the subsequent SC period, wherein:
      a maximum number of SL processes configured for the first user equipment are associated with the plurality of SL grants, and each of the plurality of SL grants is associated with one of the maximum number of SL processes in a one-to-one manner;
      for one of the maximum number of SL processes, a second SL grant transmitted in subframe n for the subsequent SC period overwrites a first SL grant previously transmitted in subframe n-X for the same subsequent SC period, wherein X is an integer value equal to or greater than the maximum number of SL processes;
      for each of the maximum number of SL processes, radio resources within the subsequent SC period are allocated according to the associated SL grant; and
      the allocated radio resources are used for the plurality of SL transmissions including at least one sidelink control information (SCI) transmission and at least one data transmission.

2. The base station according to claim 1, wherein the plurality of SL grants for the subsequent SC period are only transmitted until 4 subframes before the start of the subsequent SC period.

3. The base station according to claim 1, wherein each of the maximum number of SL processes is re-initialized before the start of the subsequent SC period.

4. The base station according to claim 3, wherein each of the maximum number of SL processes is re-initialized 3 subframes before the start of the subsequent SC period.

5. The base station according to claim 1, wherein a logical channel prioritization (LCP) procedure is performed for each of the maximum number of SL processes.

6. The base station according to claim 5, wherein the LCP procedure includes identifying different destination Group IDs used in the plurality of SL transmissions.

7. A method performed by a base station, the method comprising:
   generating a plurality of sidelink (SL) grants to allocate radio resources for a first user equipment to perform a plurality of direct SL transmissions over an SL interface to one or more second user equipments; and
   transmitting, to the first user equipment, the plurality of SL grants for a subsequent sidelink control (SC) period, before a start of the subsequent SC period, wherein:
      a maximum number of SL processes configured for the first user equipment are associated with the plurality of SL grants, and each of the plurality of SL grants is associated with one of the maximum number of SL processes in a one-to-one manner;
      for one of the maximum number of SL processes, a second SL grant transmitted in subframe n for the subsequent SC period overwrites a first SL grant previously transmitted in subframe n-X for the same subsequent SC period, wherein X is an integer value equal to or greater than the maximum number of SL processes;
      for each of the maximum number of SL processes, radio resources within the subsequent SC period are allocated according to the associated SL grant; and
      the allocated radio resources are used for the plurality of SL transmissions including at least one sidelink control information (SCI) transmission and at least one data transmission.

8. The method according claim 7, wherein the plurality of SL grants for the subsequent SC period are only transmitted until 4 subframes before the start of the subsequent SC period.

9. The method according to claim 7, wherein each of the maximum number of SL processes is re-initialized before the start of the subsequent SC period.

10. The method according to claim 9, wherein each of the maximum number of SL processes is re-initialized 3 subframes before the start of the subsequent SC period.

11. The method according to claim 7, wherein a logical channel prioritization (LCP) procedure is performed for each of the maximum number of SL processes.

12. The method according to claim 11, wherein the LCP procedure includes identifying different destination Group IDs used in the plurality of SL transmissions.

* * * * *